(12) United States Patent
Noguchi

(10) Patent No.: US 11,193,800 B2
(45) Date of Patent: Dec. 7, 2021

(54) ABSOLUTE POSITION DETECTION APPARATUS AND METHOD THAT OBTAINS THE POSITION BASED ON FIRST AND SECOND SIGNALS OF A PERIODIC PATTERN, AND STORAGE MEDIUM OF SAME

(71) Applicant: CANON KABUSHIKI KAISHA, Tokyo (JP)

(72) Inventor: Kazuhiro Noguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 16/536,729

(22) Filed: Aug. 9, 2019

(65) Prior Publication Data

US 2020/0064164 A1 Feb. 27, 2020

(30) Foreign Application Priority Data

Aug. 27, 2018 (JP) .............................. JP2018-157893

(51) Int. Cl.
*G01D 5/347* (2006.01)
(52) U.S. Cl.
CPC ....... *G01D 5/34792* (2013.01); *G01D 5/3473* (2013.01)
(58) Field of Classification Search
CPC ............. G01D 5/34792; G01D 5/3473; G01D 5/34776; G01D 5/347
See application file for complete search history.

(56) References Cited

U.S. PATENT DOCUMENTS

| 5,563,408 A | 10/1996 | Matsumoto et al. |
| 5,883,298 A * | 3/1999 | Holzapfel .............. G01D 18/00 73/1.79 |
| 9,347,802 B2 | 5/2016 | Horiguchi |
| 2015/0130931 A1* | 5/2015 | Shigeta .............. G01D 5/34792 348/135 |

(Continued)

FOREIGN PATENT DOCUMENTS

| CN | 103674081 A | 3/2014 |
| CN | 104457805 A | 3/2015 |

(Continued)

OTHER PUBLICATIONS

Extended European Search Report issued in European Appln. No. 19193598.0 dated Dec. 4, 2019.

(Continued)

*Primary Examiner* — Jennifer D Bennett
(74) *Attorney, Agent, or Firm* — Rossi, Kimms & McDowell LLP

(57) ABSTRACT

An absolute position detection apparatus includes a calculator configured to generate, based on a detection signal, a first signal, and a second signal. A relative movement range of the scale and the sensor includes a boundary between adjacent detection units in the first signal such that at least one of the boundary is included in each of a plurality of areas in the relative movement range. The calculator is configured to specify a detection unit, to be used to calculate the absolute position, in the first signal based on a code of each detection unit of the second signal in an area that includes the boundary of the plurality of areas.

7 Claims, 17 Drawing Sheets

(56) References Cited

U.S. PATENT DOCUMENTS

| | | |
|---|---|---|
| 2016/0258787 A1 | 9/2016 | Honda |
| 2017/0069076 A1 | 3/2017 | Yoshimuta |
| 2018/0058885 A1 | 3/2018 | Kudo |

FOREIGN PATENT DOCUMENTS

| | | | |
|---|---|---|---|
| EP | 2650654 A1 | | 10/2013 |
| JP | H0526658 A | * | 2/1993 |
| JP | H05026658 A | | 2/1993 |
| JP | 2009068978 A | | 4/2009 |
| JP | 2011214846 A | | 10/2011 |
| JP | 2013234861 A | | 11/2013 |

OTHER PUBLICATIONS

Office Action issued in Chinese Appln. No. 201910781002.1 dated Jul. 30, 2021. English machine translation provided.

* cited by examiner $N_D = \text{INT}\{[5 \times \theta_U - \theta_D + 180°] \div 360°\}$

ABSOLUTE POSITION DETECTION APPARATUS AND METHOD THAT OBTAINS THE POSITION BASED ON FIRST AND SECOND SIGNALS OF A PERIODIC PATTERN, AND STORAGE MEDIUM OF SAME

BACKGROUND OF THE INVENTION

Field of the Invention

The present invention relates to an absolute position detection apparatus and method, and a storage medium

Description of the Related Art

Japanese Patent Application Laid-Open No. ("JP") 05-26658 discloses one of the above absolute type position detection apparatuses. This position detection apparatus reads two magnetic scales at slightly different pitches λa and λb through a magnetic sensor, and generates an absolute position signal that changes like a sawtooth wave shape at a pitch λc using a phase difference between the two obtained phase signals. In addition, it reads a gray code as an optical scale through an optical sensor at the pitch λc for the magnetic scale by according the origins with each other and by specifying what number each wave portion is from the origin.

JP2013-234861 discloses another position detection apparatus. This position detection apparatus spatially multiplexes by alternately arranging periodic patterns with long slightly different periods $P_1$ and $P_1'$ and periodic patterns with short slightly different periods $P_2$ and $P_2'$ on two scale tracks. The sensor reads these periodic patterns in a time division manner. It generates a Vernier signal Sv1 (=$\phi1-\phi1'$) from the periodic patterns with the long periods $P_1$ and $P_1'$, and a Vernier signal Sv2 (=$\phi2-\phi2'$) from the periodic patterns with the short periods $P_2$ and $P_2'$. An absolute position is detected with accuracy of Sv2 by synchronizing Sv1 and Sv2 with each other.

However, the position detection apparatus disclosed in JP 05-26658 cannot accurately specify what number each wave portion is, a boundary between two adjacent wave portions in the absolute position signal shifts from a boundary between the optical scales. In addition, as the movable range of the movable member becomes wide, the bit number of the gray code needs to be increased, which may be disadvantageous from the space saving aspect.

The position detection apparatus disclosed in JP2013-234861 generates the Vernier signal using two periodic patterns with slightly different pitches and thus limits the moving amount of the movable member for detecting the absolute position due to a periodic pattern shape accuracy, a pitch error, and the like, which can be practically realized in a manufacturing process.

SUMMARY OF THE INVENTION

An aspect of embodiments provides, for example, an absolute position detection apparatus beneficial in an absolute position detection length thereof.

An absolute position detection apparatus according to one aspect of the present invention includes a scale with a periodic pattern, a sensor configured to output a detection signal corresponding to the periodic pattern according to a relative movement between the scale and the sensor, and a calculator configured to generate, based on the detection signal, a first signal having a detection unit as a first relative movement amount between the scale and the sensor, and a second signal having a detection unit as a second relative movement amount, smaller than the first relative movement amount, between the scale and the sensor, and to obtain the absolute position based on the first and second signals. A relative movement range of the scale and the sensor includes a boundary between adjacent detection units in the first signal such that at least one of the boundary is included in each of a plurality of areas in the relative movement range. The calculator is configured to specify a detection unit, to be used to calculate the absolute position, in the first signal based on a code of each detection unit of the second signal in an area, that includes the boundary, of the plurality of areas. An apparatus having the absolute position detection apparatus, an absolute position detection method corresponding to the absolute position detection apparatus and a non-transitory computer-readable storage medium storing a program that enables a computer to execute the absolute position detection method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
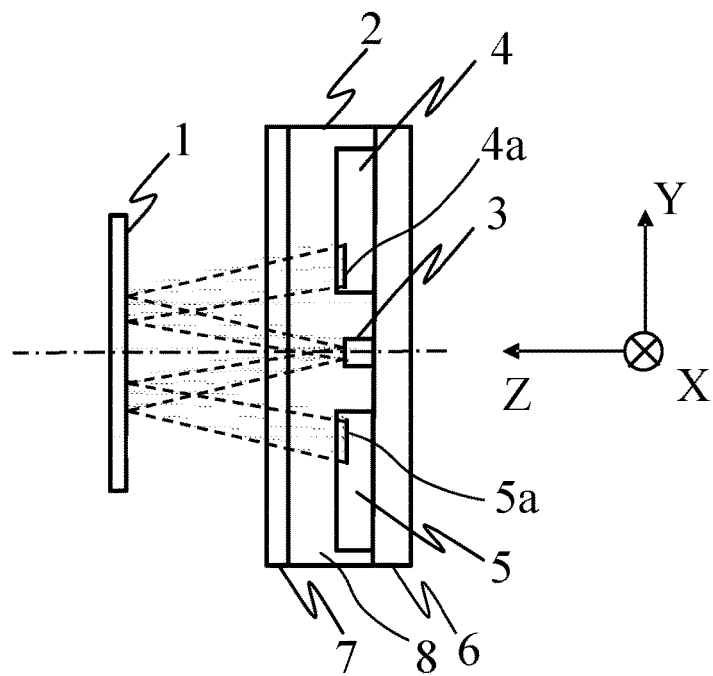
FIG. 1 illustrates a reflective scale and a sensor of a position detection apparatus according to a first embodiment of the present invention.

FIG. 1 illustrates a reflective scale (scale having a periodic pattern) 1 and a sensor head (a sensor configured to output a detection signal corresponding to the periodic pattern: referred to simply as a sensor hereinafter) which constitute a position detection apparatus according to a first embodiment of the present invention. In the figure, X, Y, and Z indicate three directions orthogonal to one another. The sensor 2 includes an LED 3 as a light emitting element, and two light receiving ICs 4 and 5. The light receiving ICs 4 and 5 respectively have light receiving element arrays 4a and 5a including a plurality of light receiving elements arranged at a predetermined pitch in the X direction as a relative movement direction (position detection direction) of the reflective scale 1 and the sensor 2. The LED 3 and the light receiving ICs 4 and 5 are mounted on a base substrate 6 and covered with a cover glass 7. A transparent resin 8 is filled in the sensor 2 (between the base substrate 6 and the cover glass 7). The reflective scale 1 and the sensor 2 are disposed so that they face each other. A light flux emitted from the LED 3 is reflected by the reflective scale 1 and enters the light receiving element arrays 4a and 5a.

Figure 2:
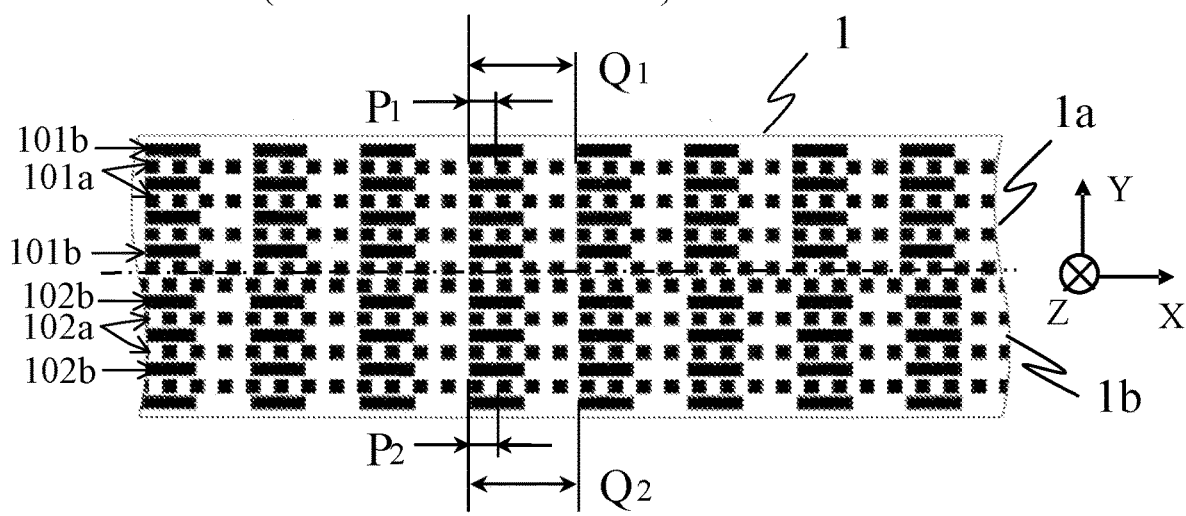
FIG. 2 illustrates a periodic pattern on the reflective scale.

FIG. 2 illustrates details of the reflective scale 1. The directions X, Y and Z in the figure are the same as the directions X, Y, and Z illustrated in FIG. 1. The reflective scale 1 has a main track 1a and a sub track 1b. The main track 1a has a periodic pattern (referred to as the first short period pattern hereinafter) 101a with a short period or a pitch $P_1$ and a periodic pattern 101b with a long period or a period $Q_1$ that is four times as long as the pitch $P_1$ (referred to as the first long period pattern hereinafter) each extending in the X direction. In the Y direction, the first short period and long period patterns 101a and 101b are alternately arranged.

The sub track 1b has a periodic pattern 102a (referred to as a second short period pattern hereinafter) 102a with a short period or a pitch $P_2$ slightly longer than the pitch $P_1$ and a periodic pattern (referred to as a second long period pattern hereinafter) 102b with a long period or a pitch $Q_2$ slightly longer than the pitch $Q_1$ each extending in the X direction. In the Y direction, the second short period and long period patterns 102a and 102b are alternately arranged.

A portion in black in the figure of each periodic pattern is a reflective portion that regularly reflects the light flux from the LED 3 and a portion in white is a non-reflective portion that does not reflect the light flux. The equiphase line illustrated in the figure is a pattern reference line in which the start positions of the respective patterns accord with each other. A relationship among the pitches $P_1$, $Q_1$, $P_2$, and $Q_2$ of the first and second short and long period patterns 101a, 101b, 102a, and 102b will be described in detail later.

Figure 3A:
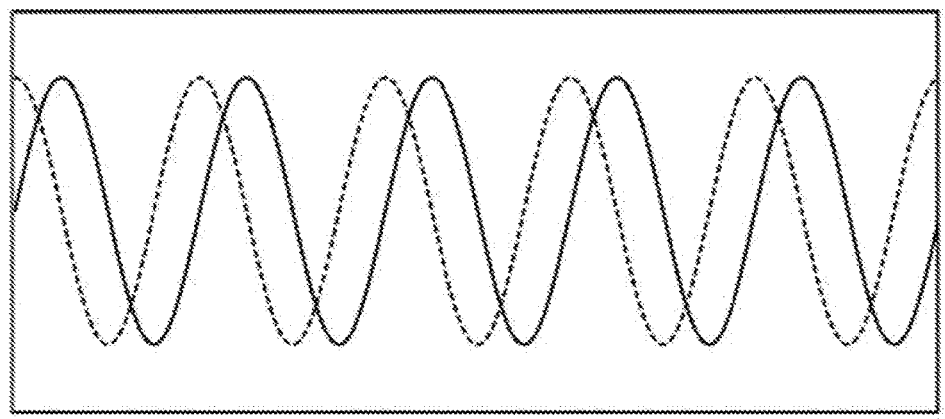
FIGS. 3A to 3C explain phase difference signals according to the first embodiment.
Figure 3B:
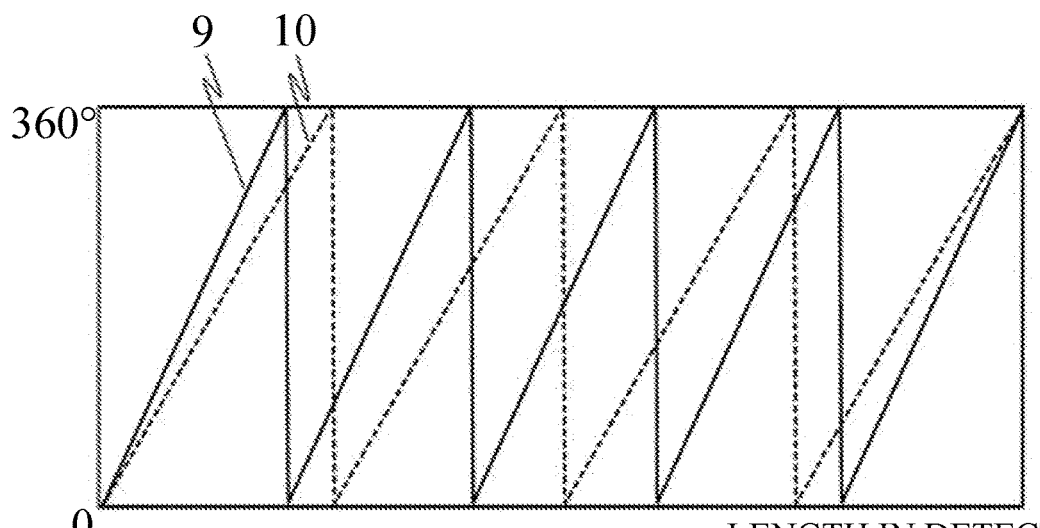
Figure 3C:
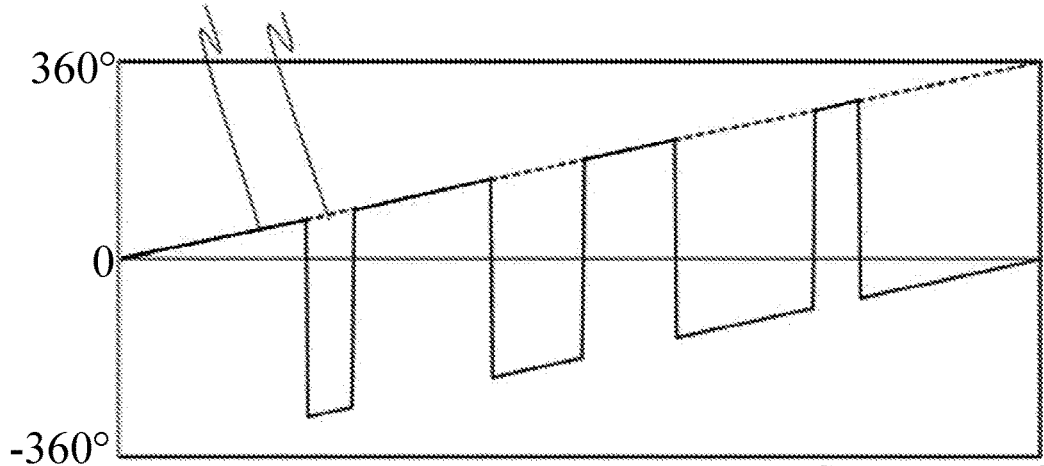

FIGS. 3A to 3C explain the phase difference signal, and a method of creating the phase difference signal will be described. FIG. 3A illustrates a representative example of the signals output from the light receiving ICs 4 and 5 as the periodic patterns move on the light receiving element arrays 4a and 5a. The graph abscissa axis represents a length in the detection direction. A sine wave signal of a 90° phase difference as shown by a solid line and a broken line is illustrated for five periods as an example.

FIG. 3B illustrates a repetitive phase signal of 0° to 360° made by the arctangent transformation of the sine wave signal of the 90° phase difference. The graph abscissa axis is common in the three graphs. A solid line 9 represents a phase signal for five periods (five waves) illustrated in FIG. 3A, and a broken line 10 represents a phase signal for four periods (four waves) in the same detection length. In other words, they are the phase signals obtained from the respective periodic patterns where the periodic pattern for five periods and the periodic pattern for four periods are arranged in the length in the same detection direction.

FIG. 3C is a graph of the phase difference signal obtained by subtracting the phase signal 10 from the phase signal 9. The abscissa axis denotes the position in the position detection direction, and the ordinate axis denotes the phase. A solid line 11a is a phase difference signal obtained by subtracting the phase signal 10 from the phase signal 9, and when the magnitude relationship is reversed, it becomes a negative phase numerical value. A broken line 11b is a signal obtained by adding 360° when the phase difference signal of the solid line 11a is negative. This processing can generate a continuous phase difference signal of 0° to 360°. Thus, it can be seen that one continuous phase difference signal is produced in the range of 0° to 360° when the difference in the periodic pattern number in the same detection length is "1."

Figure 4A:
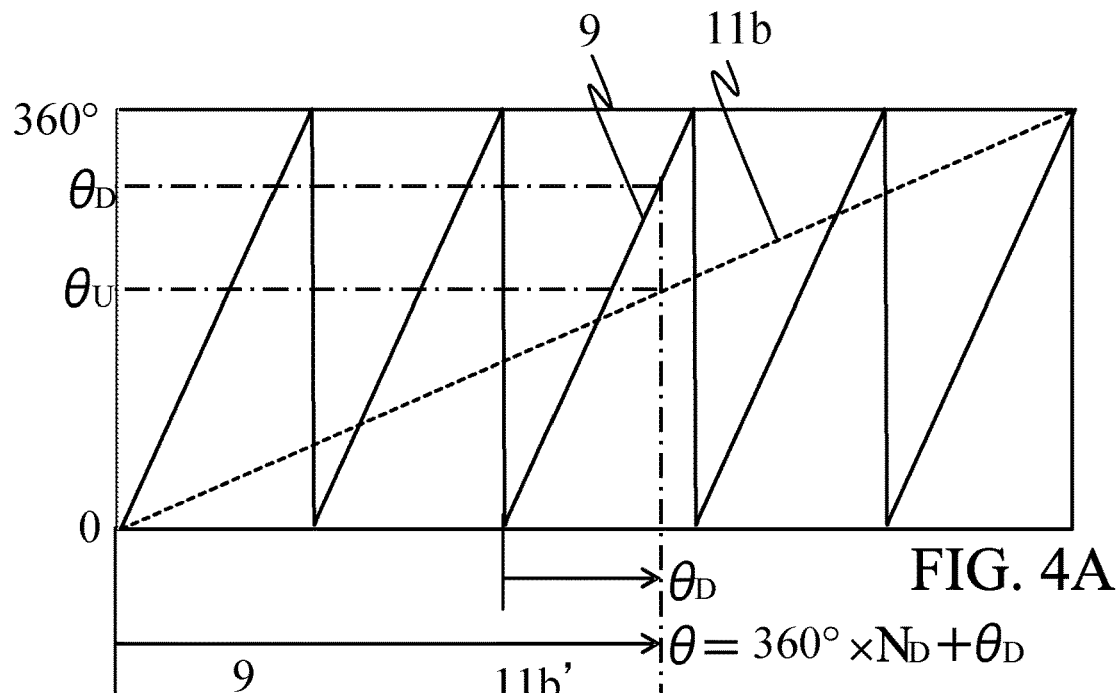
FIGS. 4A to 4C explain a synchronization calculation according to the first embodiment.
Figure 4B:
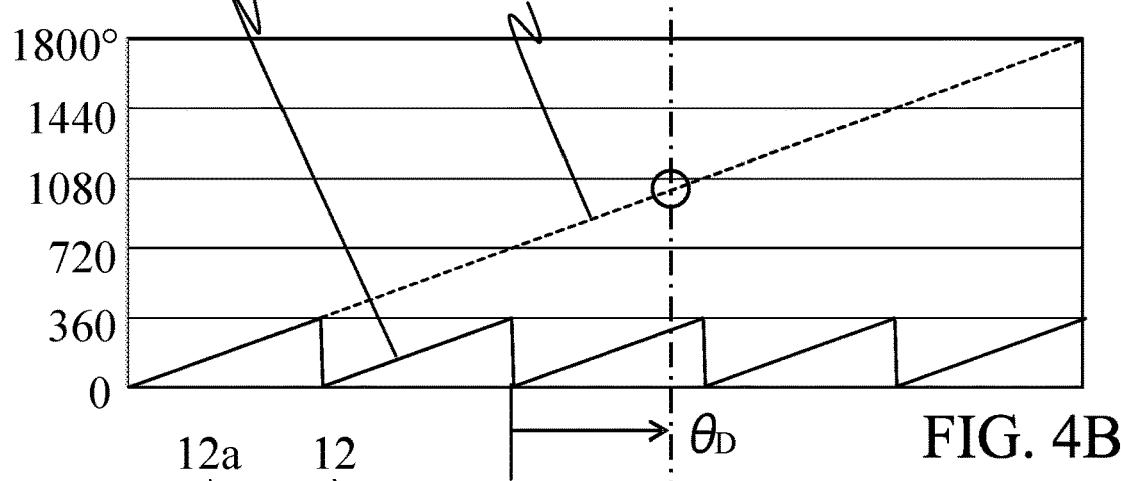
Figure 4C:
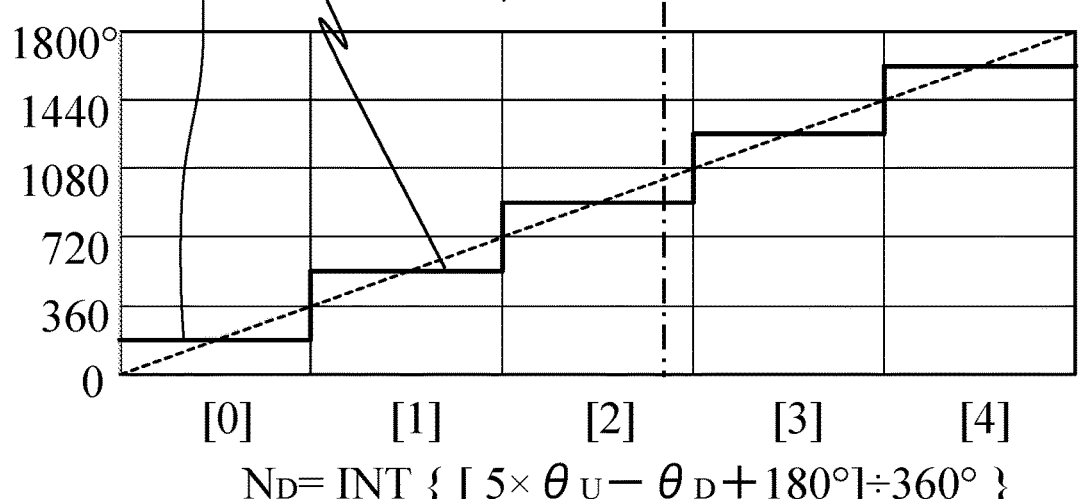

FIGS. 4A to 4C explain the synchronization calculation, and a description will be given of a procedure for finalizing an absolute position from one phase difference signal correlated with an arbitrary position of the repetitive phase signal 9. FIG. 4A is a graph of the phase signal 9 shown by a solid line and the phase difference signal 11b shown by a broken line explained in FIGS. 3A-3C, where the abscissa axis denotes the length in the detection direction and the ordinate axis denotes the phase, and a range of degrees from 0° to 360° is shown. Since five waves of the phase signal 9 are shown and one wave of the phase difference signal 11b is shown, it is clear that the signal slopes are different by five times.

FIG. 4B illustrates a signal 11b' obtained by multiplying the phase difference signal 11b by five and the phase signal 9 in a magnified display range of the ordinate axis from 0° to 1800° (=360°×5) so that the above signal slopes coincide with each other.

FIG. 4C explains a calculation for determining the number of each wave of the phase signal 9 (code: referred to as a wave number hereinafter). Subtracting the phase signal 9 from the signal 11b' and adding 180° result in a stepped signal shown by reference numeral 12. While the phase signal 9 and the phase difference signal 11b are expressed by a clean straight line, the phase difference signal 11b is a difference signal between the phase signal 9 and the phase signal 10 illustrated in FIG. 3B and thus error components of both original signals are contained. The signal 11b' contains a larger error signal because it has been magnified by five times. The stepped signal 12 is not a clean straight line, for example, the first signal 12a is a signal including an error range by setting an average value to about 180° between 0° and 360°.

When the stepped signal 12 is divided by 360° and only its integer part is extracted, a wave number "$N_D$" (=0 to 4) for each of the five waves in the phase signal 9 is calculated. When the signal including the error is in the state of ±180° or higher, the correct wave number cannot be obtained, the wave numbers on both sides are indicated, and thus the correct synchronization calculation cannot be performed.

Referring back to FIG. 4A, a description will be given of a position of an arbitrary phase $\theta_U$ of the phase difference signal 11b. The phase of the phase signal 9 at that position is $\theta_D$, and the wave number "$N_D$" at that position is expressed by the above synchronization calculation as follows.

$$N_D = \text{INT}\{[5 \times \theta_U - \theta_D + 180] \div 360\} \quad (1)$$

From the expression (1), $N_D$ becomes 2. However, INT( ) is a integer conversion (integerization) that rounds the decimal point. Hence, the absolute value (absolute position) θ at this position is expressed as follows.

$$\theta = 360 \times N_D + \theta_D \quad (2)$$

From the expression (2), an accurate detection (calculation) is available using the phase signal 9 as the original signal based on the phase difference signal 11b including the large error of the absolute position θ by adding two prior phases 360×2 of the phase signal 9 to the phase $\theta_D$ of the phase signal 9 at the current position.

A description will be given of how to set the periodic patterns with the pitches $P_1$, $Q_1$, $P_2$, and $Q_2$ illustrated in FIG. 2. According to this embodiment, on the main track 1a, 75 pitches $Q_1$ each of which is four times as long as the pitch $P_1$ in the X-axis direction is as long as 300 pitches $P_1$. On the other hand, on the sub track 1b, the pitches $P_2$ and $Q_2$ are set such that 290 pitches $P_2$ and 74 pitches $Q_2$ have the same length. In other words, the following expression is established among the pitches $P_1$, $Q_1$, $P_2$, and $Q_2$.

$$P_1 \times 300 = Q_1 \times 75 = P_2 \times 290 = Q_2 \times 74$$

As described for the phase difference signal with reference to FIGS. 3B and 3C, a phase difference signal of 1 (=75–74) wave is produced with the pitches $Q_1$ and $Q_2$, and a phase difference signal of 10 (=300–290) waves is produced with the pitches $P_1$ and $P_2$.

Figure 5A:
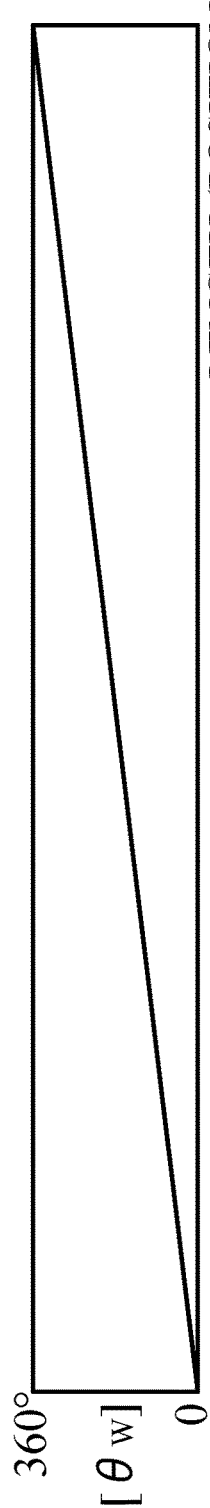
FIGS. 5A to 5D explain a detection unit according to the first embodiment.
Figure 5B:
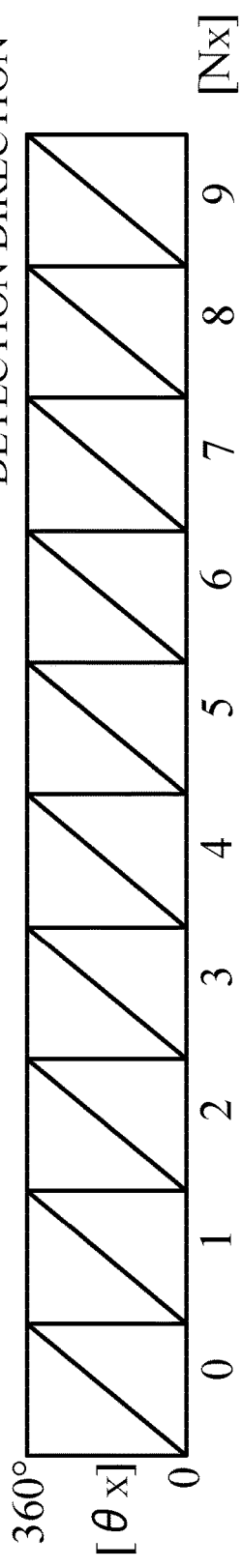
Figure 5C:
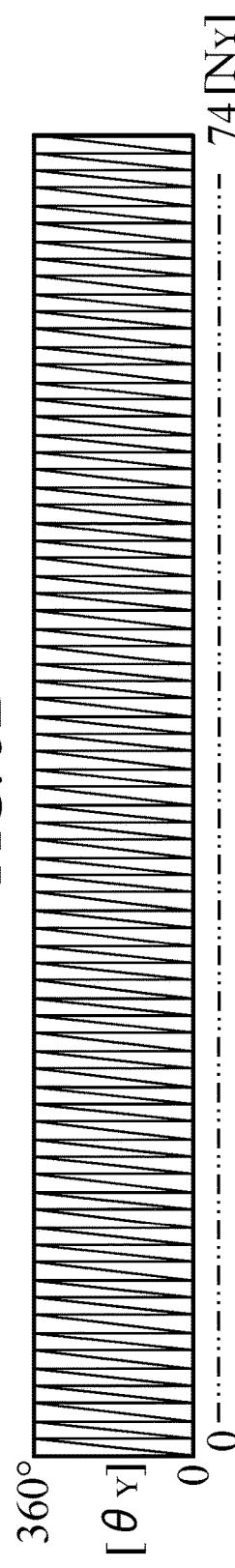
Figure 5D:
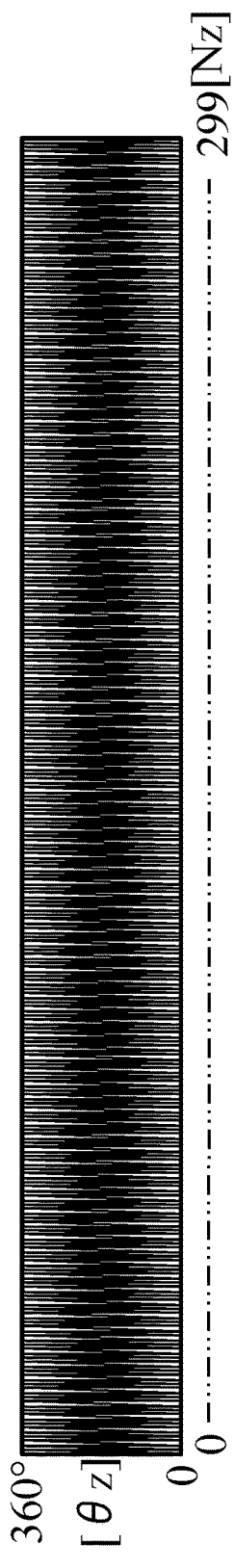

FIGS. 5A to 5D explain detection units as a unit for detecting an absolute position. FIG. 5A illustrates one phase difference signal produced with the pitches $Q_1$ and $Q_2$, and FIG. 5B illustrates ten phase difference signals produced with pitches $P_1$ and $P_2$. FIG. 5C illustrates seventy-five phase signals produced with the pitch $Q_1$, and FIG. 5D illustrates three hundred phase signals produced with the pitch $P_1$.

Assume that the phase value in FIG. 5A is $\theta_W$ and the phase value in FIG. 5B is $\theta_X$. Then, the wave number "$N_X$" is determined by the calculation of the following expression (3) through the synchronization calculation described in FIGS. 4A to 4C.

$$N_X = \text{INT}\{[10 \times \theta_W - \theta_X + 180] \div 360\} \quad (3)$$

Assume that the phase value in FIG. 5C is $\theta_Y$. Then, the signal slope for $\theta_X$ is 7.5 times and thus the wave number "$N_Y$" is determined as [0 to 74] by the calculation of the following expression (4).

$$N_Y = \text{INT}\{[7.5 \times (360 \times N_X + \theta_X) - \theta_Y + 180] \div 360\} \quad (4)$$

Assume that the phase value in FIG. 5D is $\theta_Z$. Then, the signal slope for $\theta_Y$ is four times and the wave number "$N_Z$" is determined as [0 to 299] by the calculation of the following expression (5).

$$N_Z = \text{INT}\{[4 \times (360 \times N_Y + \theta_Y) - \theta_Z + 180] \div 360\} \quad (5)$$

Thus, the phase difference signal $\theta_X$ and the phase signals $\theta_Y$ and $\theta_Z$ as the lower signals (intermediate signal, lower signal and lowest signal) respectively are correlated with the phase difference signal $\theta_W$ of one wave as the uppermost signal illustrated in FIG. 5A. A portion of the length in the detection direction (relative movement amount) to which each wave number is attached in each of these signals is one detection unit.

Figure 6:
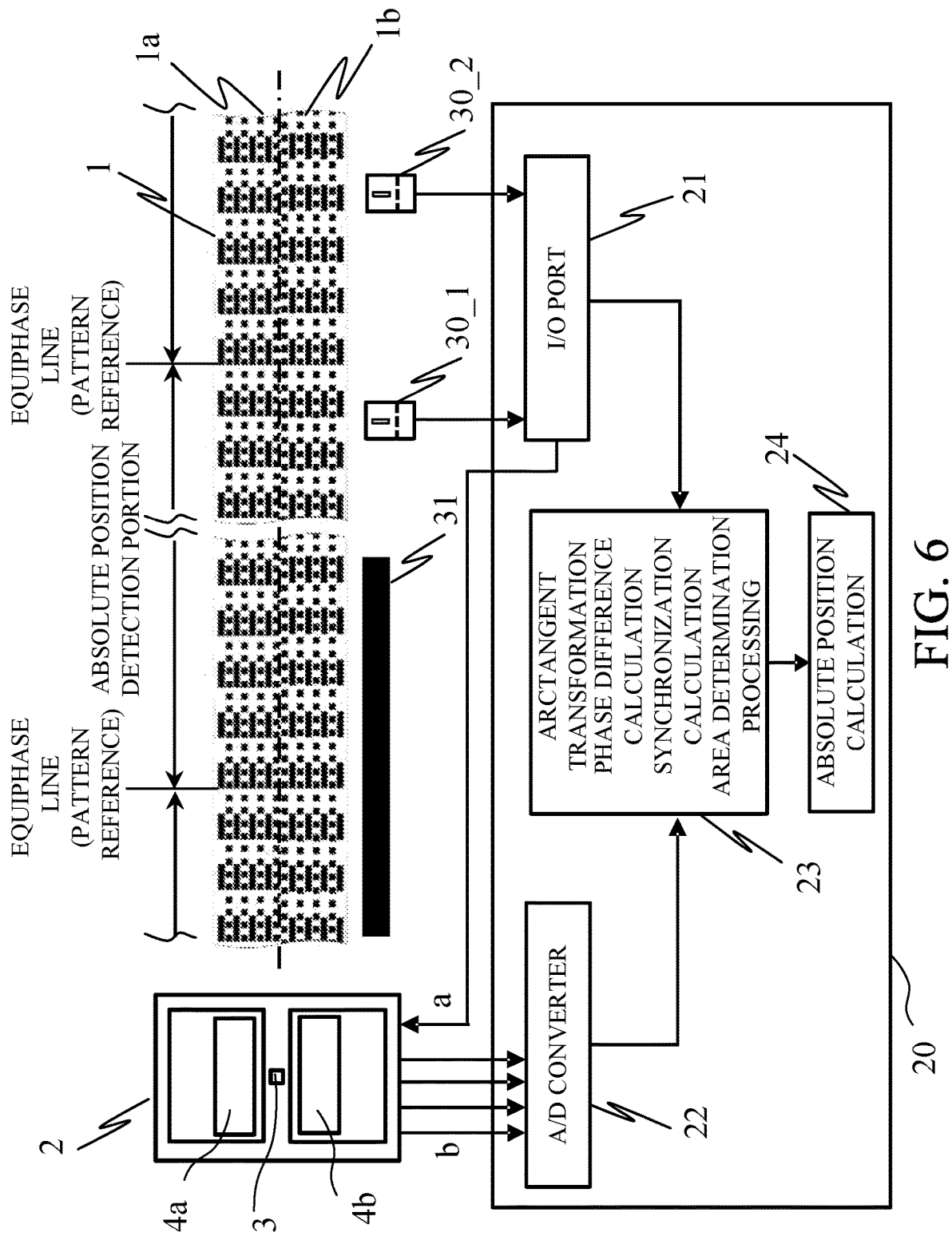
FIG. 6 illustrates a configuration of the position detection apparatus according to the first embodiment.

FIG. 6 illustrates a configuration of the position detection apparatus according to this embodiment. While the reflective scale 1 and the sensor 2 illustrated in FIG. 1 actually face each other, they are shown side by side in FIG. 6. The range sandwiched between two equiphase lines in the reflective scale 1 is one detection unit (labelled as an absolute position detection unit in FIG. 6) described with reference to FIGS. 5A to 5D. The periodic patterns with the pitches $P_1$, $Q_1$, $P_2$, and $Q_2$ are continuous on the right and left sides.

The microcomputer 20 performs a variety of operations and determinations including the above synchronization calculation. The microcomputer 20 outputs the signal "a" from an I/O port 21 to switch the internal circuits of the light receiving ICs 4 and 5 in the time division manner. Thereby, the states in which the light receiving element arrays 4a and 4b read the first and second short periodic patterns 101a and 102a illustrated in FIG. 2 and the states in which the light receiving element arrays 4a and 4b read the first and second long period patterns 101b and 102b are alternately switched.

The sensor 2 outputs two signals "b" having a 90° phase difference corresponding to the pitches $P_1$ and $P_2$ of the first and second short period patterns 101a and 102a or the pitch $Q_1$ and $Q_2$ of the first and second long period patterns 101b and 102b. An A/D converter 22 in the microcomputer 20 A/D-converts the signal b. Thereby, a signal as a digital signal is input to an processor 23 in the microcomputer 20.

A light-shielding plate 31 is fixed onto a movable member, and moves integrally with the movable member. Photo-interrupters (PI_1 and PI_2) 30_1 and 30_2 that constitute a divider together with the light-shielding plate 31 switch the output signal between H and L when the light-shielding plate 31 enters and exits from the space between the light-emitting portion and the light-receiving portion. Output signals from the photo-interrupters 30_1 and 30_2 (referred to as division signals hereinafter) are input to the processor 23 through the I/O port 21 in the microcomputer 20.

The processor 23 performs an arctangent transformation, a phase difference calculation, a synchronization calculation, and area determination processing using the input digital signal and division signal, and outputs the calculation and determination results to an absolute position calculator 24 in the microcomputer 20. The absolute position calculator 24 calculates the absolute position of the movable member using the input calculation and determination results. The processor 23 and the absolute position calculator 24 constitute a calculator.

Figure 7A:
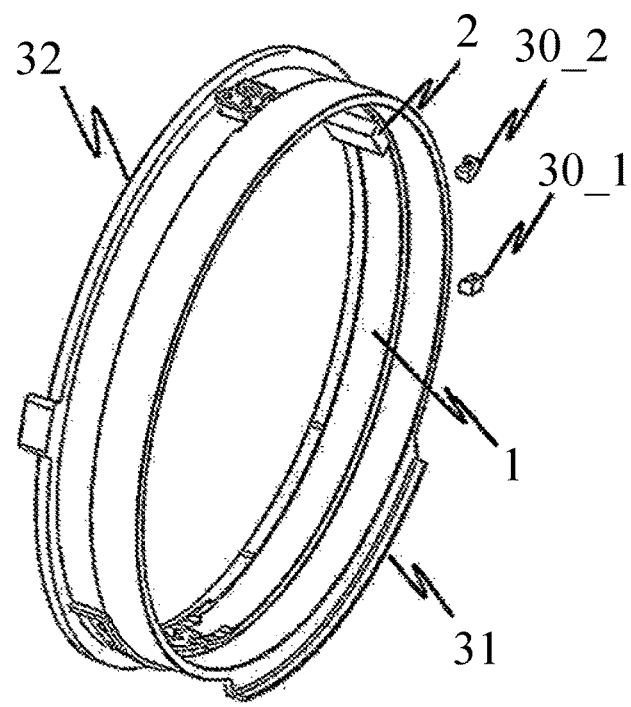
FIGS. 7A and 7B are perspective views of the position detection apparatus according to the first embodiment.
Figure 7B:
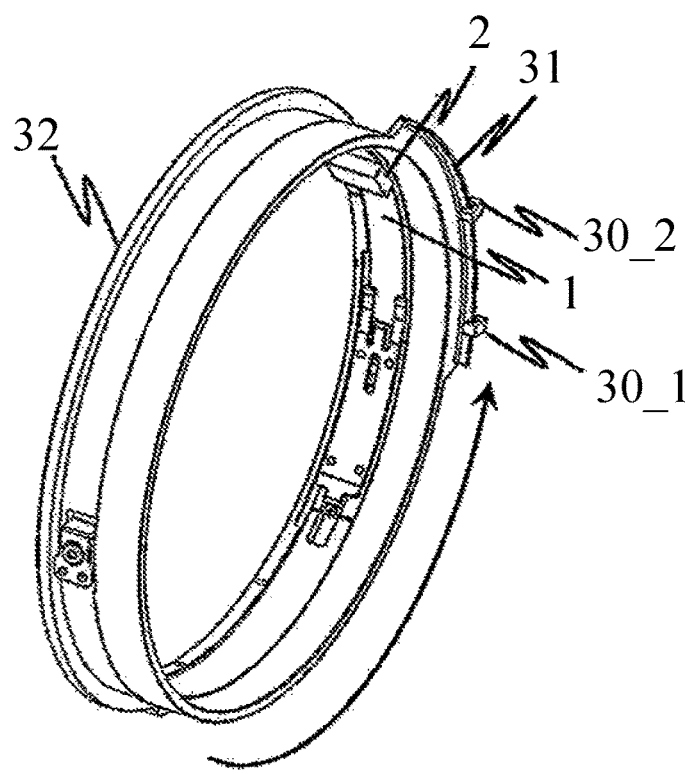

FIGS. 7A and 7B illustrate a specific configuration of the position detection apparatus according to this embodiment used for an interchangeable lens or a lens barrel for a camera. The lens barrel has a rotation ring 32 as the movable member rotatable by the user. The rotation ring 32 is rotatable around an optical axis in a predetermined rotation range relative to an unillustrated fixed barrel. The reflective scale 1 is fixed onto the inner circumference portion of the rotation ring 32 and extend in the circumferential direction (in the position detection direction). The sensor 2 facing the reflective scale 1 is fixed onto the outer circumference portion of an unillustrated fixed barrel. The position detection apparatus detects the rotational position (absolute position) of the rotation ring 32.

The light-shielding plate 31 is integrated with the rotation ring 32. The light-shielding plate 31 rotates as the rotation ring 32 rotates, and moves in and out of the spaces between the light-emitting portions and the light-receiving portions of the photo-interrupters 30_1 and 30_2 fixed onto the fixed barrel.

Figure 8:
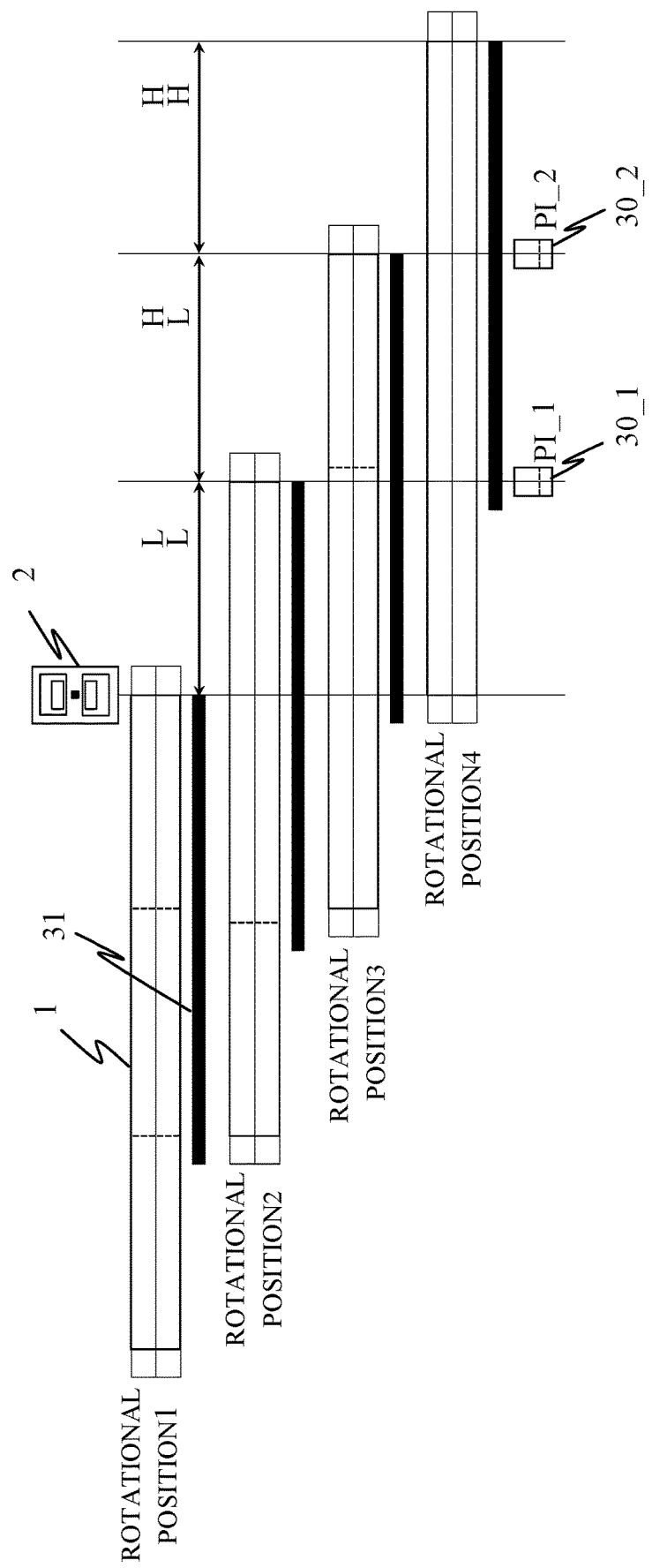
FIG. 8 explains a division of a determination area according to the first embodiment.

Referring now to FIG. 8, a description will be given of a division of the absolute position detection range as the relative movement range between the reflective scale 1 and the sensor 2 according to this embodiment. FIG. 8 is a developed view of the sensor 2 and the photo interrupters 30_1 and 30_2 fixed onto the fixed barrel and the reflective scale 1 and the light-shielding plate 31 integrally provided on the rotating ring 32 in the position detection direction in the configuration illustrated in FIGS. 7A and 7B. The rotational positions 1 and 4 of the rotation ring 32 indicate both end positions of the absolute position detection range. The photo-interrupters 30_1 and 30_2 as the detecting portions (detecting devices) output a division signal H in the light shielding state in which the light-shielding plate 31 enters the space between the light-emitting portion and the light-receiving portion, and a division signal L in the light transmission state in which the light-shielding plate 31 exits from the space between the light-emitting portion and the light-receiving portion.

Since both of the photo-interrupters 30_1 and 30_2 are in the light transmission states between the rotational positions 1 and 2, the division signals output from them become L and L, respectively. Since the photo-interrupter 30_1 is in the light shielding state from the rotational position 2 to the rotational position 3, the division signals from the photo interrupters 30_1 and 30_2 become H and L, respectively. Since the photo interrupter 30_2 is also in the light shielding state from the rotational position 3 to the rotational position 4, the division signals from the photo interrupters 30_1 and 30_2 become H and H, respectively. Thus, the absolute position detection range is divided into a plurality of (three in this embodiment) areas by the combination of the division signals from the photo interrupters 30_1 and 30_2. Each divided area will be referred to as a determination area in the following description.

The photo-interrupters 30_1 and 30_2 as the detecting portions and the light-shielding plate 31 as the detected portion are arranged side by side in the rotation direction of the rotation ring 32 as the position detection direction.

Figure 9:
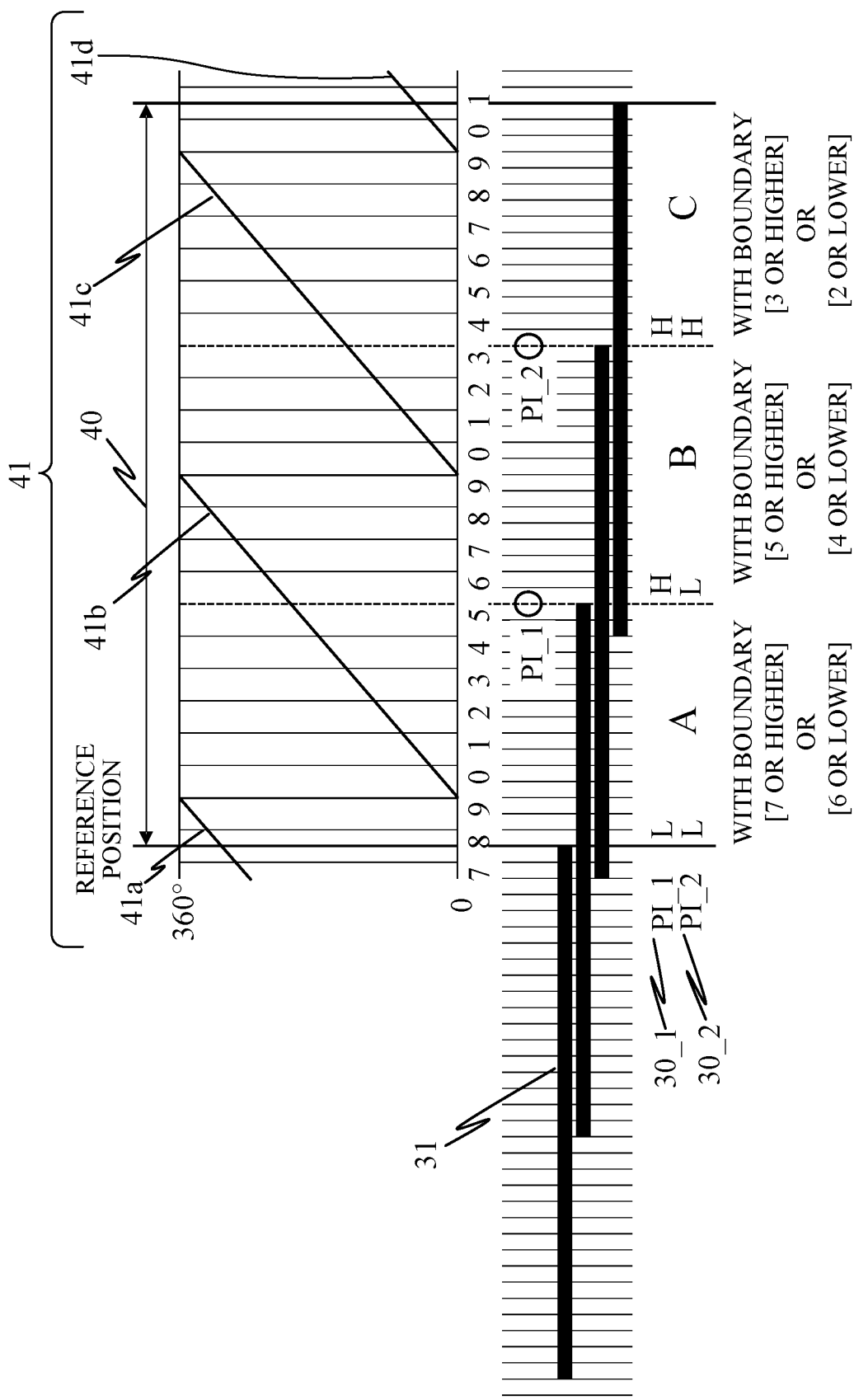
FIG. 9 explains an absolute position calculation according to the first embodiment.

Referring now to FIG. 9, a description will be given of a calculation of the absolute position according to this embodiment. An upper side in FIG. 9 illustrates a phase difference signal ($\theta_W$) 41 (41a to 41d) as the first signal illustrated in FIG. 5A in the absolute position detection range 40. A range in the position detection direction in which the phase of the phase difference signal 41 changes from 0° to 360° is one detection unit (first relative movement amount) of the phase difference signal 41. In FIG. 9, the absolute position detection range 40 has a length 2.3 times as long as the detection unit of the phase difference signal 41, and there are three boundaries among the detection units (first to fourth waves 41a to 41d) in the absolute position detection range 40. Assume that $N_W$ is the wave number of the phase difference signal 41. Then, the wave number of the first wave 41a of the phase difference signal 41 is $N_W=0$, the wave number of the second wave 41b is $N_W=1$, the wave number of the third wave 41c is $N_W=2$, and the wave number of the fourth wave 41d is $N_W=3$.

The boundary between two adjacent waves in the phase difference signal ($\theta_X$) as the second signal illustrated in FIG. 5B superimposed on the phase difference signal 41 is indicated by a vertical line. The numerals 0 to 9 attached between the boundaries or for each detection unit (second relative movement amount) of the phase difference signal $\theta_X$ are wave numbers $N_X$ of the phase difference signal $\theta_X$.

A lower side of FIG. 9 illustrates the position (illustrated in black) of the light-shielding plate 31 moving in the position detection direction with the reflective scale 1 and the division signals (H or L) from the photo-interrupters (PI_1 and PI_2) 30_1 and 30_2.

This embodiment calculates the absolute position with the accuracy of the phase difference signal $\theta_X$. The phase difference signal $\theta_X$ changes its phase from 0 to 360° for each wave. The absolute position detection range 40 is divided into three determination areas A, B, and C by the light-shielding plate 31 and the photo-interrupters 30_1 and 30_2 as described with reference to FIG. 8. The length in the position detection direction of each determination area is shorter than "one detection unit" of the phase difference signal 41. The determination areas A, B, and C each include at most one boundary between two adjacent detection units (waves) in the phase difference signal 41 inside both ends thereof. The determination area A is an area from the rotational position 1 to the rotational position 2 illustrated in FIG. 8, and the determination area B is an area from the rotational position 2 to the rotational position 3. The determination area C is an area from the rotational position 3 to the rotational position 4.

Figure 10:
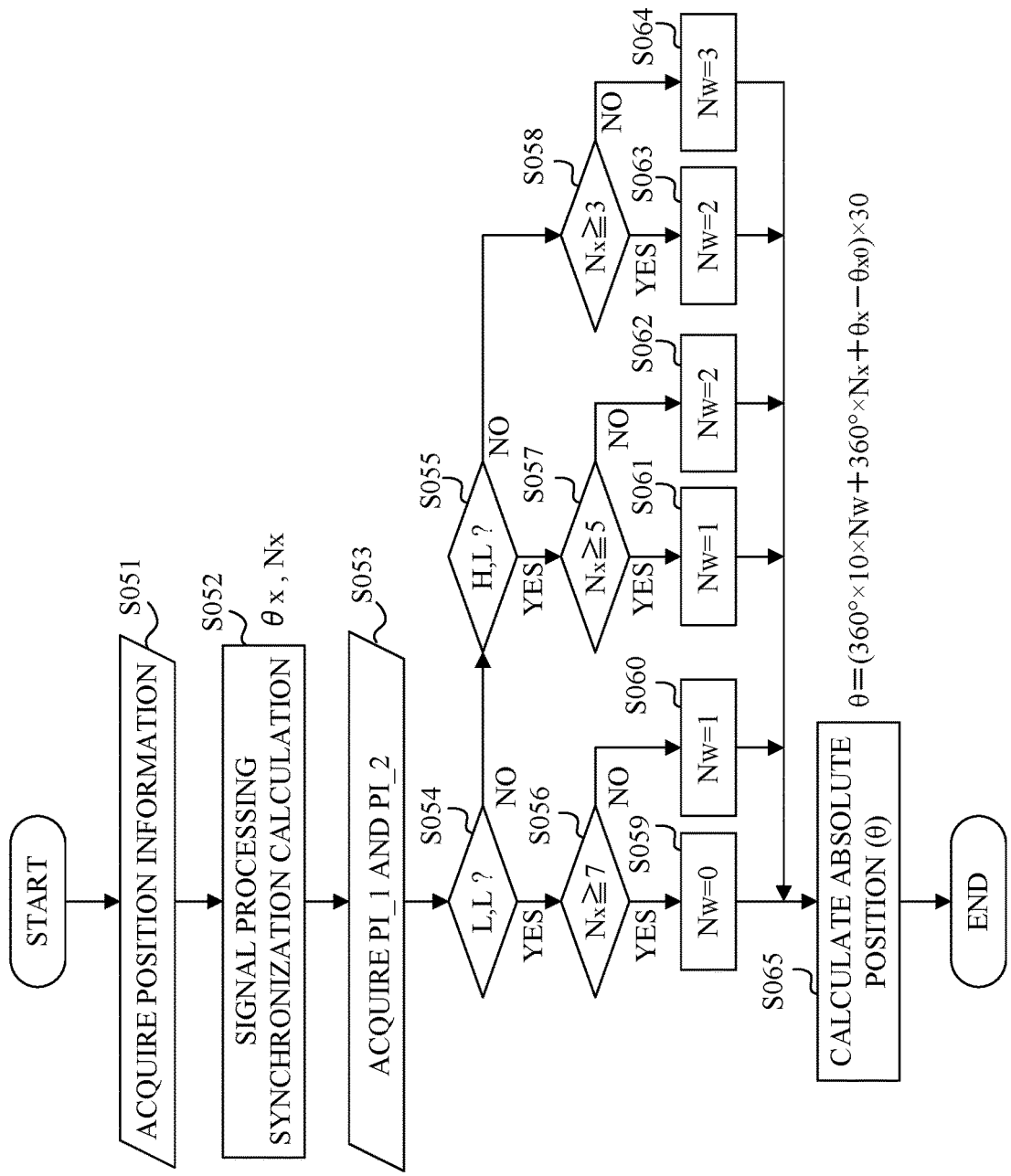
FIG. 10 is a flowchart of absolute position calculation processing according to the first embodiment.

Referring now to a flowchart in FIG. 10, a description will be given of absolute position calculation processing (position detection method) according to this embodiment. The microcomputer 20 (processor 23 and absolute position calculator 24) execute this processing according to a computer program. In the following description, S stands for the step.

The microcomputer 20 that has started the absolute position calculation processing acquires position information from the sensor 2 in S051, and performs signal processing and synchronization calculation for the signal acquired in S052. Thereby, the phase difference signal $\theta_X$ and its wave number $N_X$ are obtained.

Next, the microcomputer 20 acquires division signals from the photo-interrupters PI_1 and PI_2 in S053, and determines which determination area the division signal indicates in S054. As illustrated in FIG. 9, when the division signals become L and L, the microcomputer 20 determines the determination area to be A and proceeds to S056, and otherwise proceeds to S055. In S055, if the division signals are H and L, the determination area is determined to be B, and the flow proceeds to S057. Otherwise (if the division signals are H and H), the determination area is determined to be C and the flow proceeds to S058.

In S056, the microcomputer 20 specifies (determines) the wave number $N_W$ of the phase difference signal $\theta_W$ using the wave number $N_X$ of the phase difference signal $\theta_X$. Then, the microcomputer 20 compares the wave number $N_X$ with a predetermined value (predetermined code), and specifies the wave number $N_W$ based on the result. More specifically, the microcomputer 20 proceeds to S059 and sets $N_W$ to 0 if $N_X$ is 7 as a predetermined value or more or if the first wave 41a illustrated in FIG. 9 is indicated. If $N_X$ is 6 as a predetermined value or less or if the second wave 41b is indicated, the flow proceeds to S060 and $N_W$ is set to 1.

In S057, the microcomputer 20 specifies the wave number $N_W$ of the phase difference signal $\theta_W$ using the wave number $N_X$ of the phase difference signal $\theta_X$. The microcomputer 20 proceeds to S061 and sets $N_W$ to 1 if $N_X$ is 5 as a predetermined value or more or if the second wave 41b is indicated. If $N_X$ is 4 or less or if the third wave 41c is indicated, the flow proceeds to S062 and $N_W$ is set to 2.

In S058, the microcomputer 20 specifies the wave number $N_W$ of the phase difference signal $\theta_W$ using the wave number $N_X$ of the phase difference signal $\theta_X$. The microcomputer 20 proceeds to S063 and sets $N_W$ to 2 if $N_X$ is 3 as a predetermined value or more or if the third wave 41c is indicated. If $N_X$ is 2 or less or if the fourth wave 41d is indicated, the flow proceeds to S064 to set $N_W$ to 3.

The microcomputer 20 thus determining the wave number $N_X$ of the current phase difference signal $\theta_X$ and the wave number $N_W$ of the phase difference signal ($\theta_W$) 41 calculates the present absolute position $\theta$ according to the following expression (7) in S065, and ends this process.

$$\theta = (360° \times 10 \times N_W + 360° \times N_X + \theta_X - \theta_{X0}) \times 30 \quad (7)$$

However, $\theta_{X0}$ is a position where the reference position at the left end of the absolute position detection range 40 illustrated in FIG. 9 is represented by the phase difference signal $\theta_X$. Since $\theta_{X0}$ contains an error component due to the attachment error of the reflective scale 1 and the sensor 2 or the like, it is written in the memory area in the microcomputer 20 in the manufacturing process of the lens barrel. Regarding the end term×30 in the expression (7), the absolute position is finalized by $\theta_X$ when the apparatus is powered on, and the subsequent positional change is used to adjust the range for the absolute position $\theta$ by increasing and decreasing the absolute position $\theta$ obtained from the value of $\theta_Z$ obtained from the pitch $P_1$ in FIG. 5D.

In this embodiment, when the pitch $P_1$ is set to 0.1 mm, the detection unit of the phase difference signal $\theta_X$ as the intermediate signal corresponds to 3 mm in detection length. The photo-interrupter PI_1 (30_1) is provided such that the signal is changed by the light-shielding plate 31 at the boundary between the wave with the wave number $N_X$ of 5 and the wave with the wave number $N_X$ of 6 in the phase difference signal $\theta_X$. However, as the condition that the wave number $N_W$ of the phase difference signal $\theta_W$ as the uppermost signal is not erroneously determined, since a switch of the signal from the photo-interrupter PI_1 may be located within one of the waves with the wave numbers 5 and 6, it may be within ±3 mm from the boundary between these waves. In other words, the high relative positional accuracy is not required for the photo-interrupter PI_1 and the light-shielding plate 31. The same applies to the relative positional accuracy between the photo-interrupter PI_2 and the light-shielding plate 31.

Second Embodiment

Figure 11:
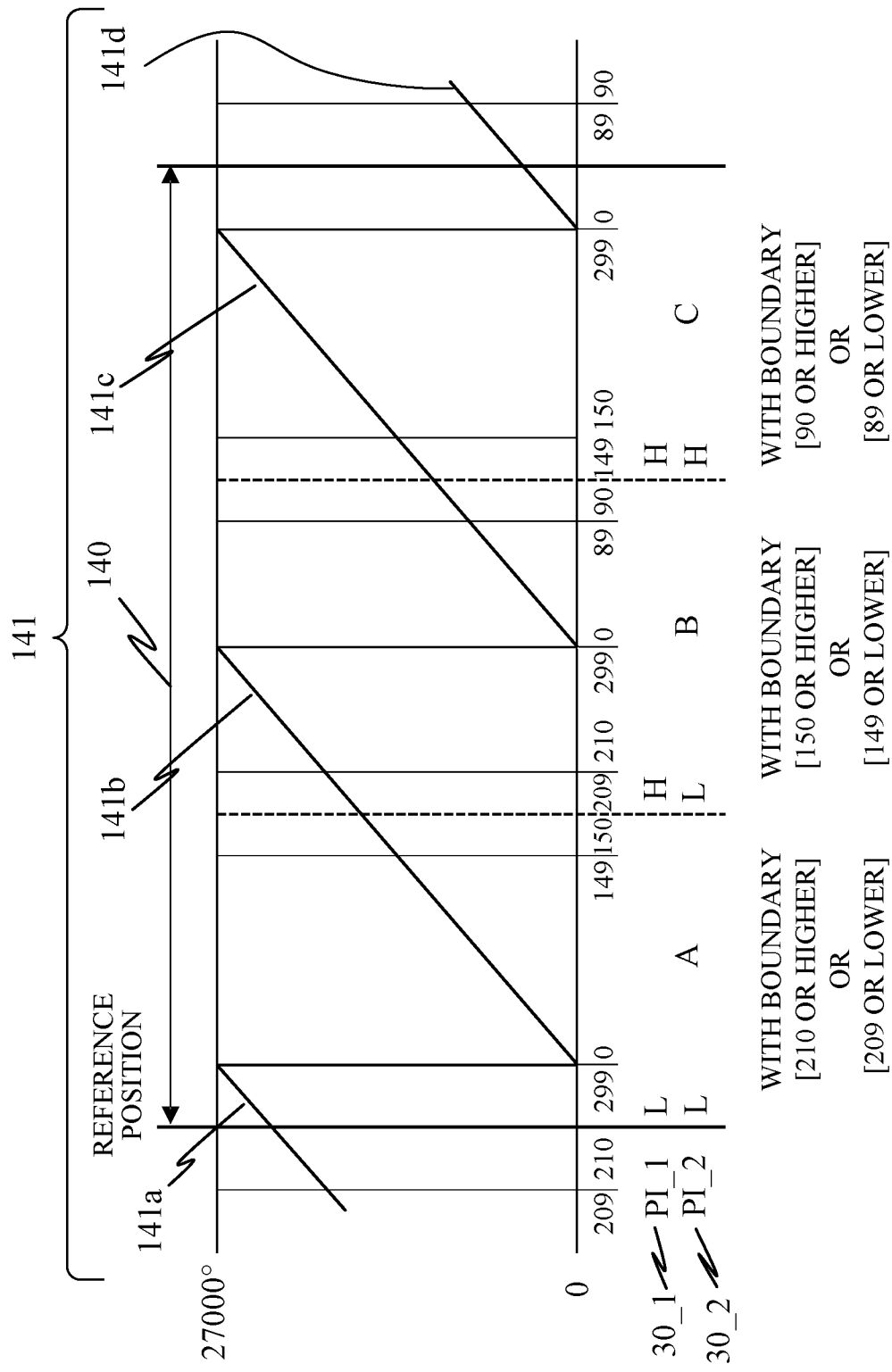
FIG. 11 explains an absolute position calculation according to a second embodiment of the present invention.

Referring now to FIG. 11, a description will be given of a calculation of the absolute position according to a second embodiment of the present invention. The position detection apparatus according to this embodiment has the same configuration as that of the first embodiment (FIG. 6), and detects the rotational position of the rotation ring 32 of the lens barrel described with reference to FIGS. 7A and 7B.

FIG. 11 illustrates a phase signal 141 (141a to 141d) as the first signal in the absolute position detection range 140. The phase signal 141 is a signal made by converting the phase signal $\theta_Y$ with the pitch $Q_1$ obtained in FIGS. 5B and 5C into an absolute value with the wave number $N_Y$. A range in the position detection direction in which the phase of the phase signal 141 changes from 0 to 27000° is one detection unit (first relative movement amount) of the phase signal 141. In FIG. 11, the absolute position detection range 140 has a length 2.3 times as long as the detection unit of the phase signal 141, and there are three boundaries among the detection units (first to fourth waves 141a to 141d) in the absolute position detection range 140. Assume that the wave number of the phase signal 141 is $N_F$. Then, the wave number of the first wave 141a of the phase signal 141 is $N_F=0$, the wave number of the second wave 141b is $N_F=1$, the wave number of the third wave 141c is $N_F=2$, and the wave number of the fourth wave 141d is $N_F=3$.

The wave number $N_Z$ corresponding to the phase signal $\theta_Z$ as the second signal illustrated in FIG. 5D superimposed on the phase signal 141 and a vertical line that displays indicates a wave numbers $N_Z$ (0 to 299) on both sides illustrate a boundary serving as a determination reference from the first wave 141a to the fourth wave 141d of the phase signal 141.

This embodiment calculates the absolute position with the accuracy of the phase signal $\theta_Z$. This embodiment divides the absolute position detection range 140 into three determination areas A, B, and C similar to the first embodiment. The length in the position detection direction of each determination area is shorter than one detection unit of the phase difference signal 141. The determination areas A, B, and C each include only one boundary between two adjacent detection units (waves) in the phase difference signal 141 inside the both ends thereof.

Figure 12:
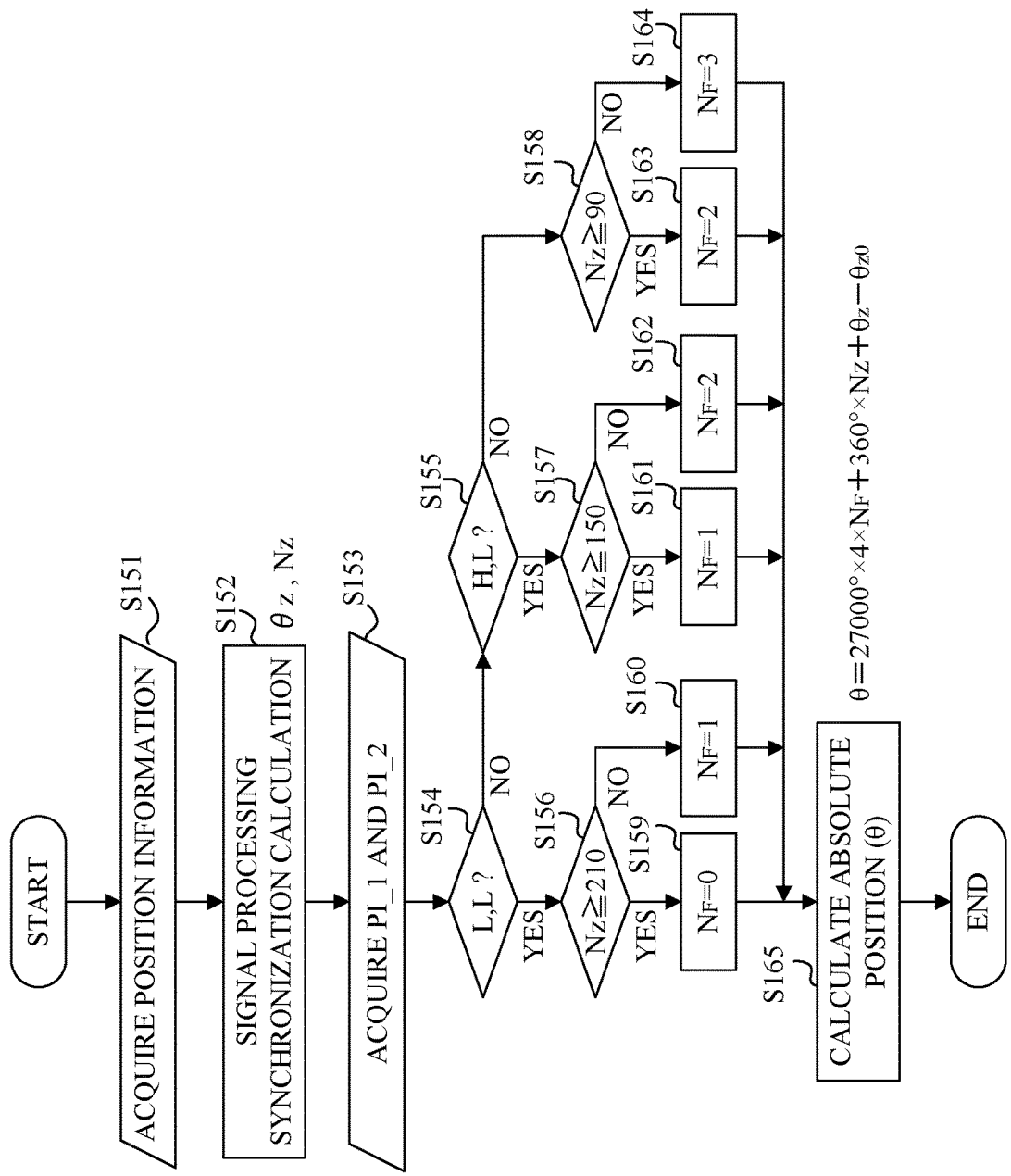
FIG. 12 is a flowchart of absolute position calculation processing according to the second embodiment.

Referring now to a flowchart in FIG. 12, a description will be given of absolute position calculation processing according to this embodiment. The microcomputer 20 (processor 23 and absolute position calculator 24) executes this process according to a computer program.

The microcomputer 20 that has started the absolute position calculation processing acquires the position information from the sensor 2 in S151, and performs signal processing and synchronization calculation for the signal acquired in S152. Thereby, the phase signal $\theta_Z$ and its wave number $N_Z$ are obtained.

Next, the microcomputer 20 acquires division signals from the photo-interrupters PI _1 and PI _2 in S153, and determines which determination area the division signals indicate in S154. If the division signals are L and L, the microcomputer 20 determines the determination area to be A and the flow proceeds to S156, otherwise proceeds to S155. If the division signals are H and L in S155, the determination area is determined to be B and the flow proceeds to S157. Otherwise (if the division signals are H and H), the determination area is determined to be C and the flow proceeds to S158.

In S156, the microcomputer 20 specifies (determines) the wave number $N_F$ of the phase signal 141 using the wave number $N_Z$ of the phase signal $\theta_Z$. If $N_Z$ is 210 as the predetermined value (predetermined code) or more or if the first wave 141a illustrated in FIG. 11 is indicated, the microcomputer 20 proceeds to S159 and sets $N_F$ to 0. If $N_Z$ is equal to or less than 209 as the predetermined value or if the second wave 141b is indicated, the flow proceeds to S160 and $N_F$ is set to 1.

In S157, the microcomputer 20 specifies the wave number $N_F$ of the phase signal 141 using the wave number $N_Z$ of the phase signal $\theta_Z$. If $N_Z$ is 150 as the predetermined value or more or if the second wave 141b is indicated, the microcomputer 20 proceeds to S161 and sets $N_F$ to 1. If $N_Z$ is 149 as the predetermined value or less (if the third wave 141c is indicated), the flow proceeds to S162 to set $N_F$ to 2.

In S158, the microcomputer 20 specifies the wave number $N_F$ of the phase signal 141 using the wave number $N_Z$ of the phase signal $\theta_Z$. If $N_Z$ is 90 as the predetermined value or more or if the third wave 141c is indicated, the microcomputer 20 proceeds to S163 to set $N_F$ to 2. If $N_Z$ is 89 as the predetermined value or less or if the fourth wave 141d is indicated, the flow proceeds to S164 to set $N_F$ to 3.

The microcomputer 20 having determined the wave number $N_Z$ of the current phase signal $\theta_Z$ and the wave number $N_F$ of the phase difference signal 141 in this way calculates the present absolute position $\theta$ according to the following expression (8) in S165 and ends this processing.

$$\theta = 27000° \times 4 \times N_F + 360° \times N_Z + \theta_Z - \theta_{Z0} \quad (8)$$

$\theta_{Z0}$ is a position where the reference position at the left end of the absolute position detection range 140 illustrated in FIG. 11 is represented by the phase signal $\theta_Z$. Since $\theta_{Z0}$ contains an error component due to the attachment error of the reflective scale 1 and the sensor 2, etc., it is written in the memory area in the microcomputer 20 in the manufacturing process of the lens barrel.

Whether the absolute position calculation accuracy is the accuracy of the phase difference signal $\theta_X$ in FIG. 5C similar to the first embodiment or the accuracy of the phase signal $\theta_Z$ in FIG. 5D similar to the second embodiment may be determined based on the calculation load, the required accuracy of the absolute position of the lens barrel, whether the synchronization calculation accuracy can be guaranteed up to the phase signal $\theta_Z$, etc.

Third Embodiment

Next follows a description of a position detection apparatus according to a third embodiment of the present invention. The first and second embodiments divide the determination area using the light-shielding plate 31 provided on the rotation ring 32 holding the reflective scale 1 and the photo-interrupters 30_1 and 30_2 fixed onto the fixed barrel. On the other hand, this embodiment divides the determination area by another method. The absolute position calculation processing is the same as that of each of the first embodiment or the second embodiment.

Figure 13A:
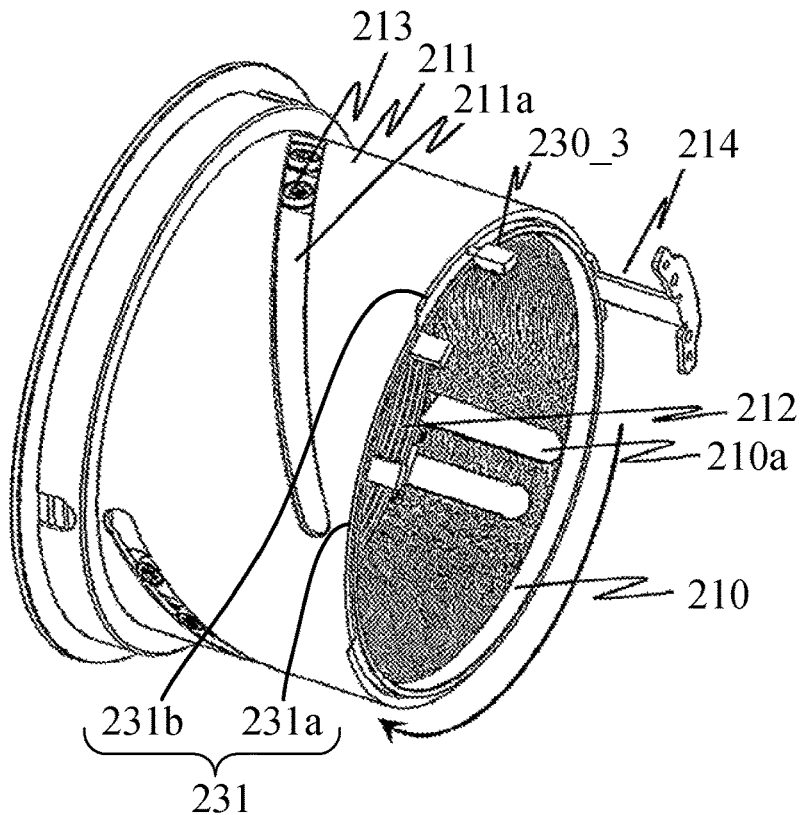
FIGS. 13A and 13B illustrate a configuration of a position detection apparatus according to a third embodiment of the present invention.
Figure 13B:
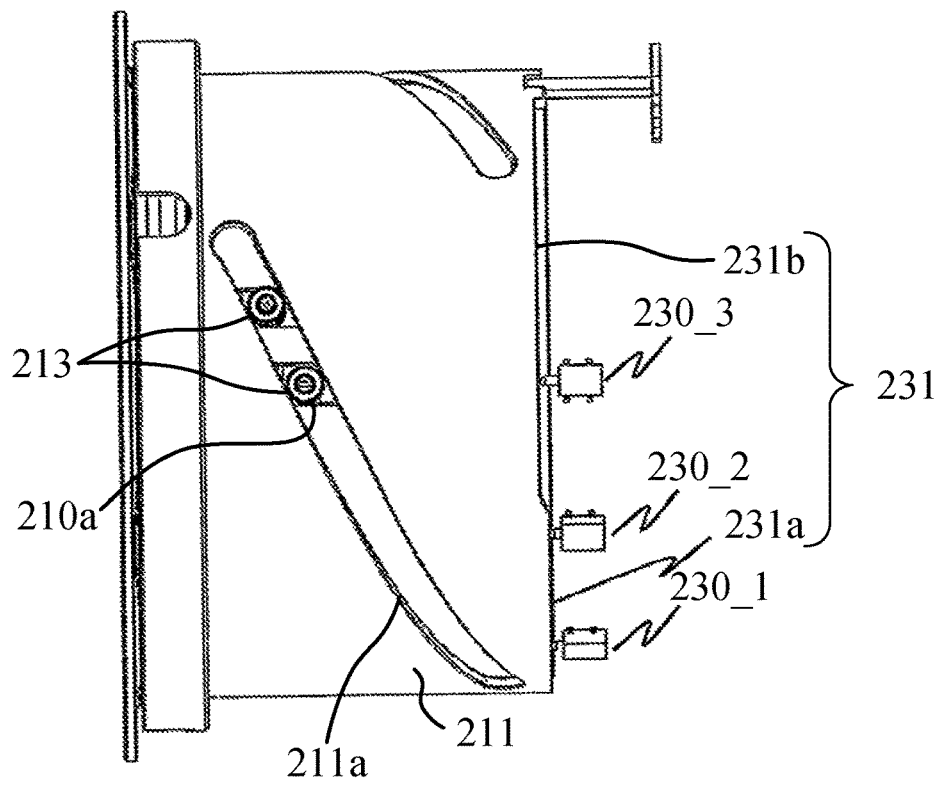

FIGS. 13A and 13B illustrate a specific configuration when the position detection apparatus according to this embodiment is used for a lens barrel. This figure illustrates a known lens moving mechanism mounted on an interchangeable lens barrel or the like. Reference numeral 210 denotes a linear movement guide barrel having three linear grooves 210a, and reference numeral 211 denotes a cam barrel having three cam grooves 211a. A lens barrel 212 and three cam follower pins 213 are fixed onto the lens barrel 212 at equal angles in the circumferential direction. The three cam follower pins 213 are held between the three linear grooves 210a and the three cam grooves 211a to support the lens, and as the cam barrel 211 rotates, the lens barrel moves forward and backward.

The rotational drive force is transmitted to the cam barrel 211 via a drive key 214. An area detection lift portion 231 has an end surface 231b provided at a rear end portion of the cam barrel 211, which includes a first end surface 231a and a second end surface 231b formed in front of the first end surface 231a by one stage and formed in a circumferential direction range different from the first end surface 231a.

Micro switches 230_1, 230_2, and 230_3 are held by an unillustrated fixed barrel at a position opposite to the area detection lift portion 231. Each micro switch outputs an L signal (division signal) where its switch pin faces the second end surface 231b, and an H division signal as the switch pin is squeezed by the first end surface 231a. The micro switches 230_1, 230_2, and 230_3 as at least one detecting portion and the area detection lift unit 231 as the detected portion are arranged side by side in the rotation direction of the cam barrel 211, which is the position detection direction.

Figure 14:
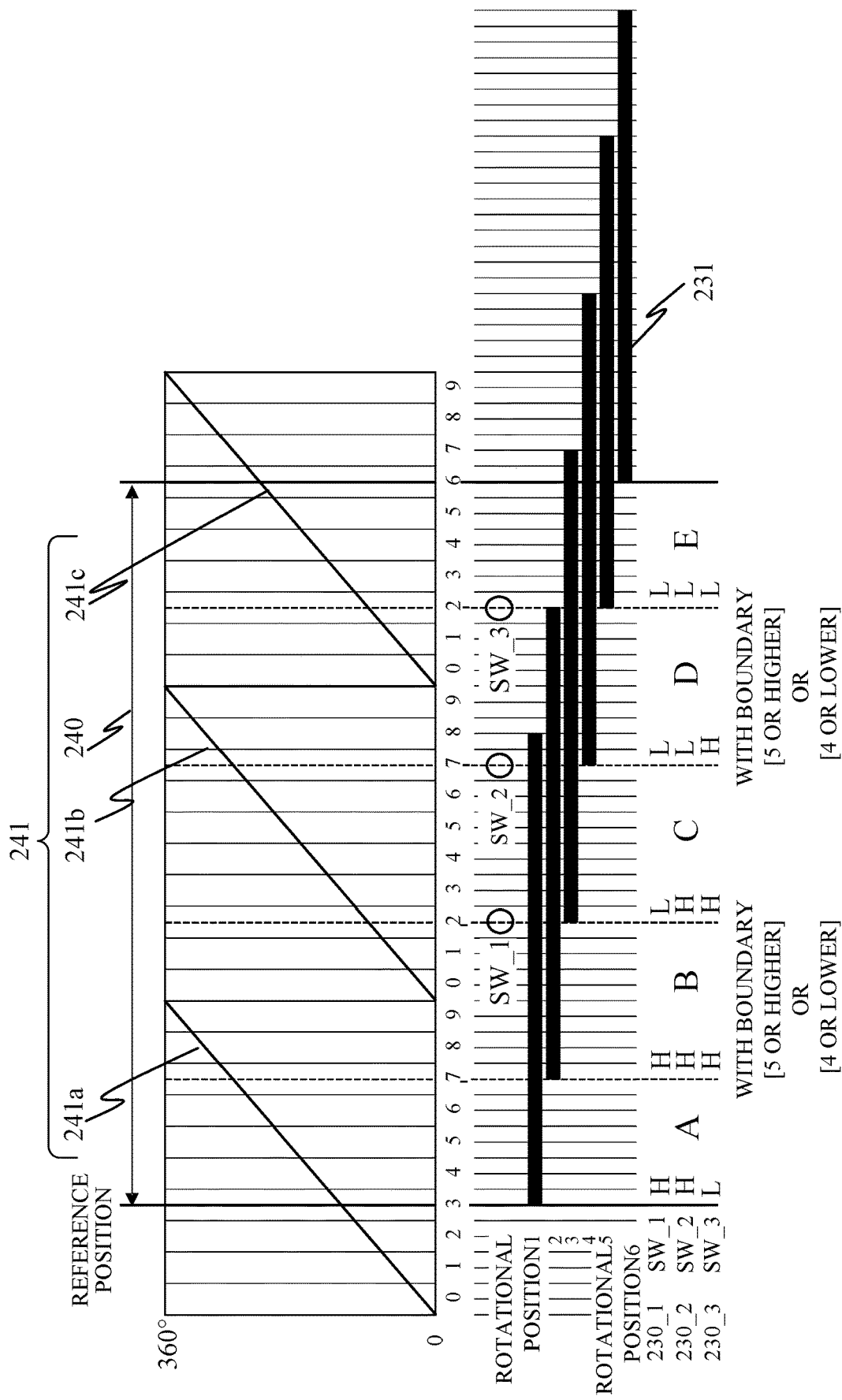
FIG. 14 explains an absolute position calculation according to the third embodiment.

Referring now to FIG. 14, a description will be given of a calculation of the absolute position according to this embodiment. The upper side in FIG. 14 illustrates the phase difference signal $(\theta_W)$ 241 (241a to 241c) illustrated in FIG. 5A in the absolute position detection range 240. A range in the position detection direction in which the phase of the phase difference signal 241 changes from 0 to 360° is one detection unit of the phase difference signal 241. In FIG. 14, the absolute position detection range 240 has a length 2.3 times as long as the detection unit of the phase difference signal 241, and there are two boundaries between the detection units (first to third waves 241a to 241c) in the absolute position detection range 240. Assume that $N_W$ is the wave number of the phase difference signal 241. Then, the wave number of the first wave 241a of the phase difference signal 241 is $N_W=0$, the wave number of the second wave 241b is $N_W=1$, and the wave number of the third wave 241c is $N_W=2$.

A vertical line shows a boundary between two adjacent waves in the phase difference signal $\theta_X$ illustrated in FIG. 5B superimposed on the phase difference signal 241. The numerals 0 to 9 attached between the boundaries or for each detection unit of the phase difference signal $\theta_X$ are the wave numbers $N_X$ of the phase difference signal $\theta_X$.

The lower side in FIG. 14 illustrates the position (illustrated in black) of the area detection lift portion 231 moving in the position detection direction with the reflective scale 1 and the division signals (H or L) from the micro switches (SW_1, SW_2, SW_3) 230_1, 230_2, and 230_3.

This embodiment calculates the absolute position with the accuracy of the phase difference signal $\theta_X$. The phase difference signal $\theta_X$ changes its phase from 0 to 360° for each wave. The absolute position detection range 240 is divided into five determination areas A, B, C, D, and E by the area detection lift portion 231 and the micro switches 230_1, 230_2, and 230_3. Each determination area in the position detection direction is shorter than one detection unit of the phase difference signal 241. The determination areas B and D each include only one boundary between two adjacent detection units (waves) in the phase difference signal 241 inside the both ends thereof.

The rotational positions 1 and 6 of the cam barrel 211 indicate both end positions of the absolute position detection range 240. The division signals output from the micro switches 230_1, 230_2, and 230_3 are H, H, and L, respectively, from the rotational position 1 to the rotational position 2 (in the determination area A). From the rotational position 2 to the rotational position 3 (in the determination area B), the division signal from the micro switch 230_3 becomes L to H, and the division signals from the micro switches 230_1, 230_2, and 230_3 become H, H, and H, respectively. From the rotational position 3 to the rotational position 4 (in the determination area C), the division signal from the micro switch 230_1 changes from H to L, and the division signals from the micro switches 230_1, 230_2, and 230_3 become L, H, and H, respectively. From the rotational position 4 to the rotational position 5 (in the determination area D), the division signal from the micro switch 230_2 changes from H to L, and the division signals from the micro switches 230_1, 230_2, and 230_3 become L, L, and H, respectively. From the rotational position 5 to the rotational position 6 (in the determination area E), the division signal from the micro switch 230_3 changes from H to L, and the division signals from the micro switches 230_1, 230_2, and 230_3 become L, L, and L, respectively.

Figure 15:
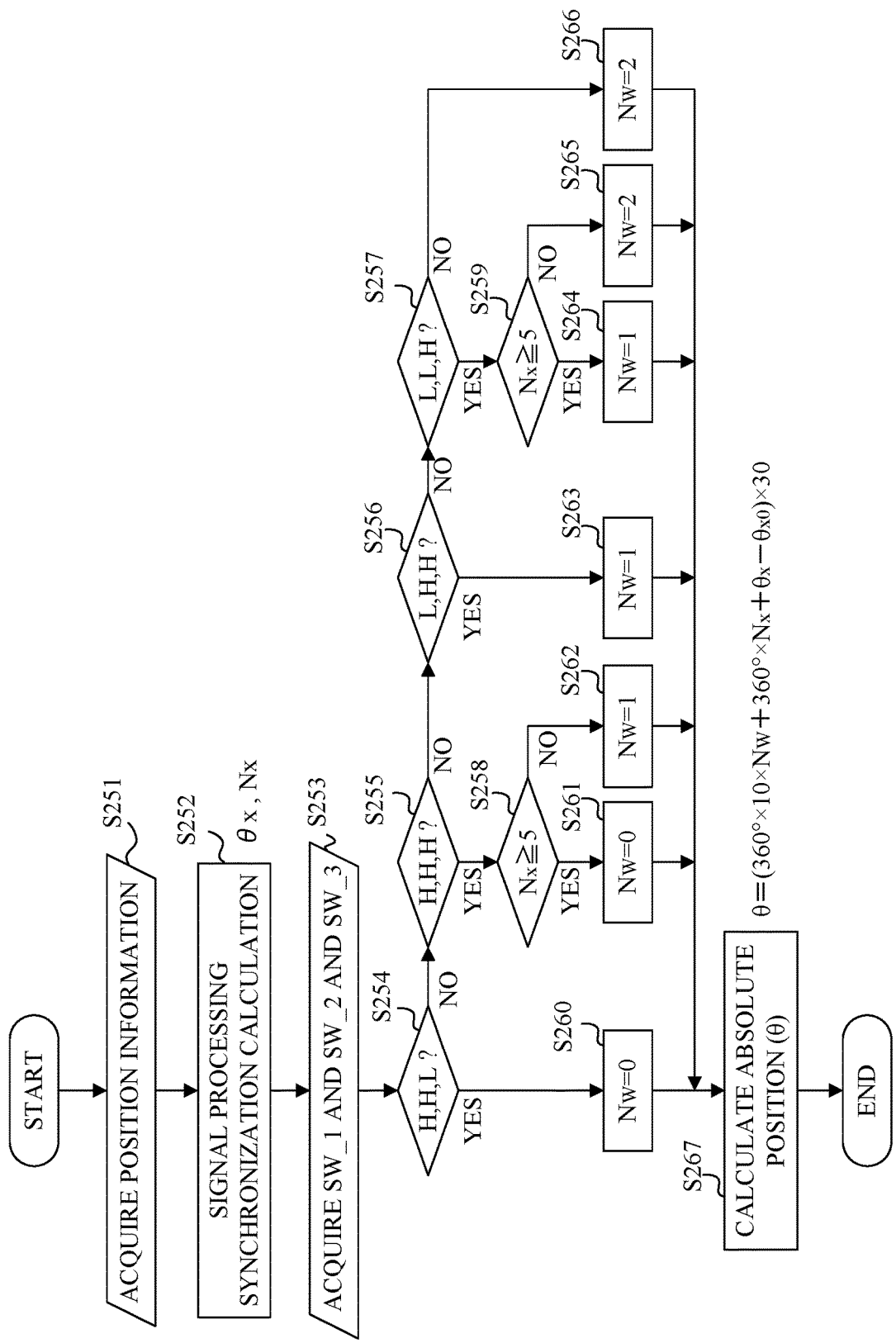
FIG. 15 is a flowchart of absolute position calculation processing according to the third embodiment.

Referring now to a flowchart in FIG. 15, a description will be given of absolute position calculation processing according to this embodiment. The microcomputer 20 (processor 23 and the absolute position calculator 24) executes this processing according to a computer program.

The microcomputer 20 that has started the absolute position calculation processing acquires the position information from the sensor in S251, and performs signal processing and synchronization calculation for the signal acquired in S252. Thereby, the phase difference signal $\theta_X$ and its wave number $N_X$ are obtained.

Next, the microcomputer 20 acquires the division signals from the micro switches 230_1, 230_2, and 230_3 in S253, and determines which determination area the division signals indicate in S254. If the division signals are H, H, and L, the microcomputer 20 determines that the determination area is A and proceeds to S260, otherwise proceeds to S255. The microcomputer 20 sets $N_W$ to 0 in S260.

If the division signals are H, H, and H in S255, the microcomputer 20 proceeds to S258, otherwise proceeds to S256. If the division signals are L, H, and H in S256, the microcomputer 20 determines the determination area to be C and proceeds to S263 to set $N_W$ to 1, otherwise proceeds to S257. If the division signals are L, L, and H in S257, the microcomputer 20 proceeds to S259. Otherwise, the microcomputer 20 determines the determination area to be E and proceeds to S266 to set $N_W$ to 2.

In S258, the microcomputer 20 specifies (determines) the wave number $N_W$ of the phase difference signal $\theta_W$ using the wave number $N_X$ of the phase difference signal $\theta_X$. If $N_X$ is 5 as the predetermined value (predetermined code) or more or if the first wave 241a illustrated in FIG. 11 is indicated, the microcomputer 20 proceeds to S261 and sets $N_W$ to 0. If $N_X$ is 4 as the predetermined value or less or if the second wave 241b is indicated, the flow proceeds to S262 to set $N_W$ to 1.

In S259, the microcomputer 20 specifies the wave number $N_W$ of the phase difference signal $\theta_W$ using the wave number $N_X$ of the phase difference signal $\theta_X$. The microcomputer 20 proceeds to S264 and sets $N_W$ to 1 if $N_X$ is 5 as the predetermined value or more or if the second wave 241b is indicated. If $N_X$ is 4 or less or if the third wave 241c is indicated, the flow proceeds to S265 to set $N_W$ 2.

The microcomputer 20 having thus determined the wave number $N_X$ of the current phase difference signal $\theta_X$ and the wave number $N_W$ of the phase difference signal ($\theta_W$) 241 calculates the current absolute position θ through the expression (7) described in S267 in the first embodiment, and ends this flow. Similar to the first embodiment, $\theta_{X0}$ in the expression (7) is a position where the reference position at the left end of the absolute position detection range 240 illustrated in FIG. 14 is represented by the phase difference signal $\theta_X$.

This embodiment increases the number of divisions of the detection range of the same length from 3 to 5 as compared with the first embodiment, and sets the boundaries on both sides of the determination area are set to wave numbers $N_X$ to 7 and 2 with respect to the wave number $N_X$ of 5 as the predetermined value used to determine the second and fourth areas including the boundary of the upper signal. Since there is room at the boundary position wider than that of the first embodiment, the setting accuracy can be mitigated. As illustrated in FIGS. 7A and 7B, the first embodiment determines the area by the light-shielding plate 31 and the photo-interrupters 30_1 and 30_2 integrated with the rotating ring 32 onto which the reflective scale 1 is fixed. When the light-shielding plate 31 and the photo-interrupters 30_1 and 30_2 are not provided on the rotary ring 32 due to the space reasons and the area is determined by another portion as in this embodiment, the accuracy becomes lower than that of the example in the first embodiment due to the mechanical accuracy, backlash and the like of the intervening member. However, since this embodiment mitigates the area determination accuracy, the erroneous detection can be sufficiently prevented even if the area is divided at a portion that is not a member to which the reflective scale is attached.

Fourth Embodiment

Figure 16A:
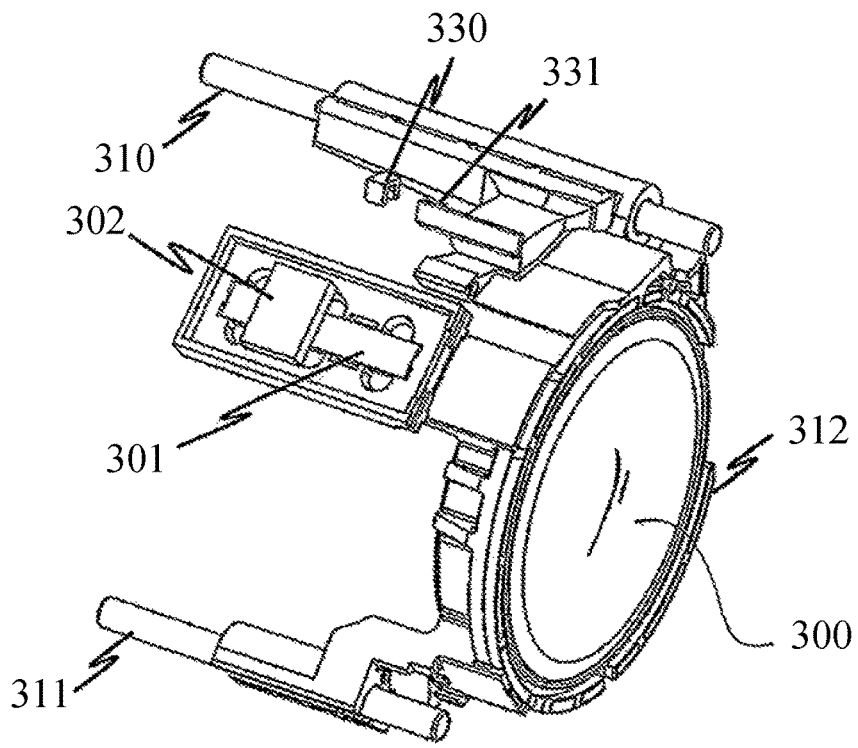
FIGS. 16A and 16B are perspective views of a configuration of a position detection apparatus according to a fourth embodiment of the present invention.
Figure 16B:
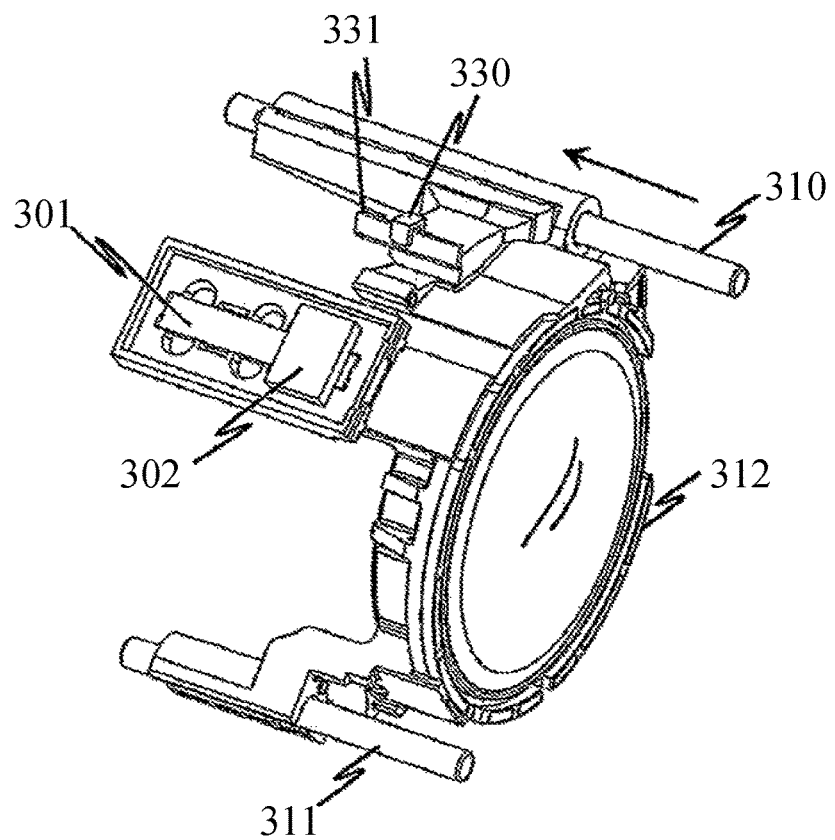

A fourth embodiment of the present invention will now be described. FIGS. 16A and 16B illustrate a specific configuration where the position detection apparatus according to this embodiment is used for an interchangeable lens or a lens barrel for a camera. The lens barrel includes a lens holding frame 312 configured to hold a lens 300, a guide bar 310 configured to guide the lens holding frame 312 in the optical axis direction, and a rotation preventive bar 311 configured to prevent the lens holding frame 312 from rotating around the guide bar 310.

A reflective scale 301 is fixed onto the lens holding frame 312 so as to extend in the optical axis direction. A sensor 302 is fixed at a position facing the reflective scale 301 in an unillustrated fixed barrel. The reflective scale 301 and the sensor 302 are configured similar to the first embodiment.

A photo-interrupter (PI) 330 is fixed onto the fixed barrel, and a light-shielding plate 331 is integrated with the lens holding frame 312. In FIG. 16A, the light-shielding plate 331 is not inserted into a space between the light-emitting portion and the light-receiving portion of the photo-interrupter 330 and is in a light transmitting state. In FIG. 16B, when the lens holding frame 312 moves in the arrow direction along the optical axis direction, the light-shielding plate 331 enters the space between the light-emitting portion and the light-receiving portion of the photo-interrupter 330 and is in the light shielding state.

Figure 17:
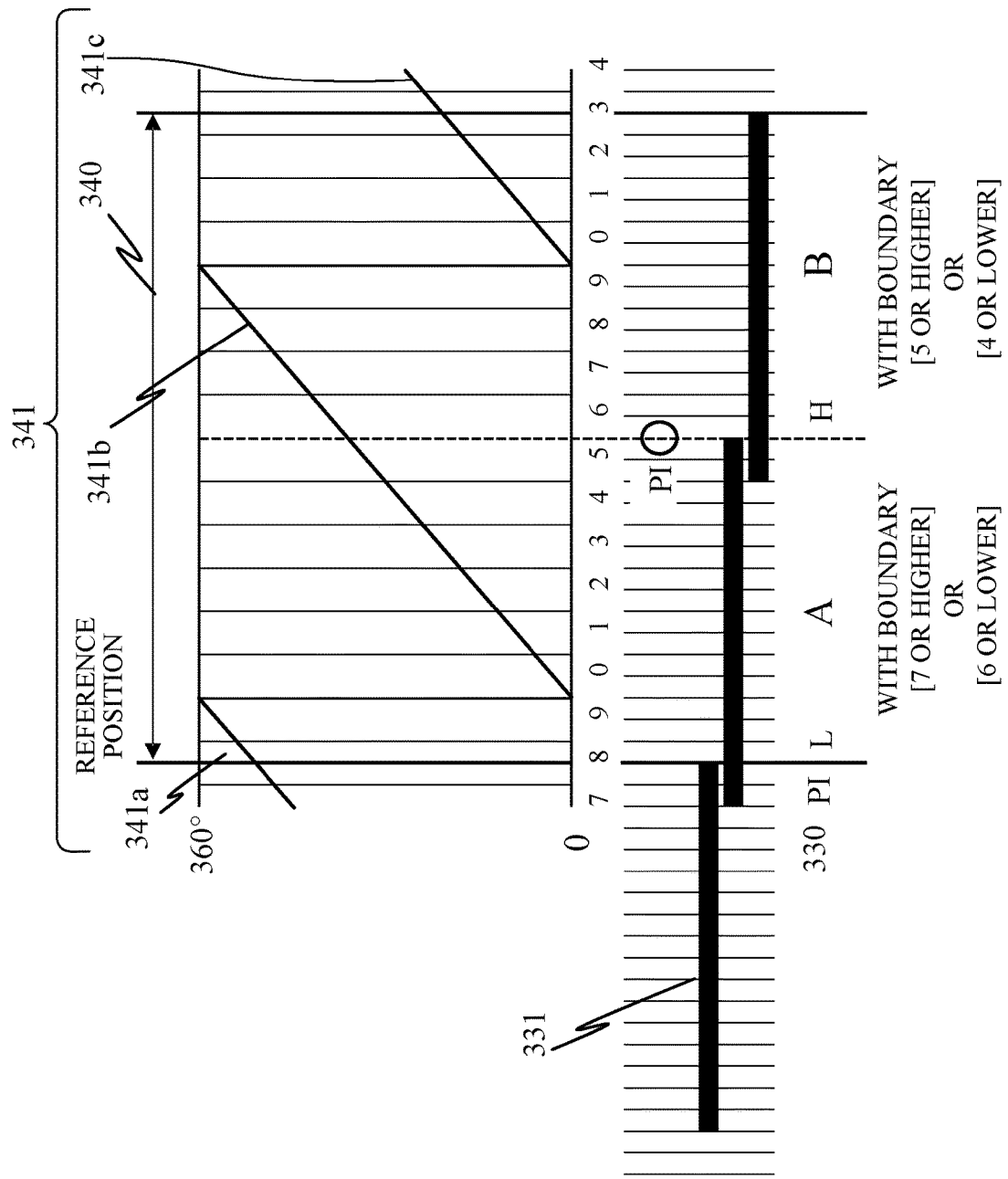
FIG. 17 explains an absolute position calculation according to the fourth embodiment.

Referring now to FIG. 17, a description will be given of a calculation of the absolute position according to this embodiment. An upper side in FIG. 17 illustrates a phase difference signal ($\theta_W$) 341 (341a to 341c) illustrated in FIG. 5A in the absolute position detection range 340. A range in the position detection direction in which the phase of the phase difference signal 341 changes from 0 to 360° is one detection unit of the phase difference signal 341. In FIG. 17, the absolute position detection range 340 has a length 1.5 times as long as the detection unit in the phase difference signal 341, and there are two boundaries between the detection units (first to third waves 341a to 341c) in the absolute position detection range 340. Three detection units of the phase difference signal 341 are included in the absolute position detection range 340. Assume that $N_W$ is the wave number of the phase difference signal 341. Then, the wave number of the first wave 341a of the phase difference signal 341 is $N_W=0$, the wave number of the second wave 341b is $N_W=1$, and the wave number of the third wave 341c is $N_W=2$.

A vertical line shows a boundary between two adjacent waves in the phase difference signal $\theta_X$ as the intermediate signal illustrated in FIG. 5B superimposed on the phase difference signal 341. The numerals 0 to 9 attached between the boundaries or for each detection unit of the phase difference signal $\theta_X$ are the wave numbers $N_X$ of the phase difference signal $\theta_X$.

The lower side in FIG. 17 illustrates the position (illustrated in black) of the light-shielding plate 331 moving in the position detection direction with the reflective scale 1 and the division signal (H or L) from the photo interrupter 330.

This embodiment calculates the absolute position with the accuracy of the phase difference signal $\theta_X$. The phase difference signal $\theta_X$ changes its phase from 0 to 360° for each wave. The absolute position detection range 340 is divided into two determination areas A and B by the light-shielding plate 331 and the photo interrupter 330. Each determination area in the position detection direction is shorter than one detection unit of the phase difference signal 341. The determination areas A and B each include only one boundary between two adjacent detection units (waves) in the phase difference signal 341 inside both ends thereof.

Figure 18:
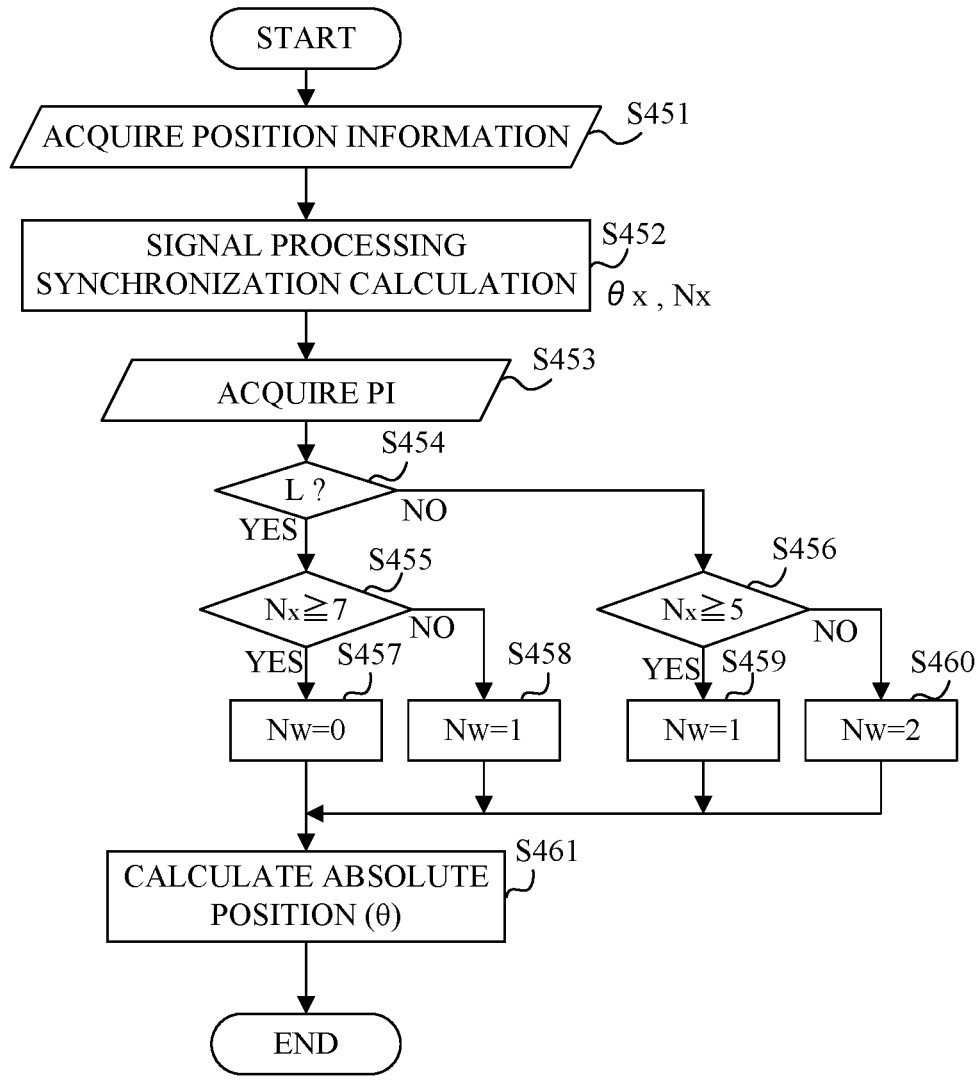
FIG. 18 is a flowchart of absolute position calculation processing according to the fourth embodiment.

Referring now to a flowchart in FIG. 18, a description will be given of the absolute position calculation processing according to this embodiment. The microcomputer 20 (processor 23 and absolute position calculator 24) executes this processing according to a computer program.

The microcomputer 20 that has started the absolute position calculation processing acquires the position information from the sensor 302 in S451, and performs signal processing and synchronization calculation for the signal acquired in S452. Thereby, the phase difference signal $\theta_X$ and its wave number $N_X$ are obtained.

Next, the microcomputer 20 obtains a division signal from the photo-interrupter 330 in S453, and determines which determination area the division signal indicates in next S454. As illustrated in FIG. 17, when the division signal is L, the microcomputer 20 determines the determination area to be A and proceeds to S455, otherwise determines the determination area to be B and proceeds to S456.

In S455, the microcomputer 20 specifies (discriminates) the wave number $N_W$ of the phase difference signal $\theta_W$ using the wave number $N_X$ of the phase difference signal $\theta_X$. If $N_X$ is 7 as the predetermined value (predetermined code) or more or if the first wave 341a illustrated in FIG. 17 is indicated, the microcomputer 20 proceeds to S457 and sets $N_W$ to 0. If $N_X$ is 6 as the predetermined value or less or if the second wave 341b is indicated, the flow proceeds to S458 to set $N_W$ to 1.

In S456, the microcomputer 20 specifies the wave number $N_W$ of the phase difference signal $\theta_W$ using the wave number $N_X$ of the phase difference signal $\theta_X$. If the $N_X$ is 5 as the predetermined value or more or if the second wave 341b is indicated, the microcomputer 20 proceeds to S459 and sets $N_W$ to 1. If $N_X$ is 4 or less or if the third wave 341c is indicated, the flow proceeds to S460 to set $N_W$ to 2.

The microcomputer 20 having thus determined the wave number $N_X$ of the current phase difference signal $\theta_X$ and the wave number $N_W$ of the phase difference signal ($\theta_W$) 341 calculates the current absolute position θ through the expression (7) described in S461 in the first embodiment, and ends this processing. Similar to the first embodiment, $\theta_{X0}$ in the expression (7) is a position where the reference position at the left end of the absolute position detection range 340 illustrated in FIG. 17 is represented by the phase difference signal $\theta_X$.

The first to fourth embodiments described above can detect the absolute position of the movable member with high accuracy without limiting the movement amount of the movable member (32, 211, 312).

The first to fourth embodiments fix the scale onto the movable member and the sensor onto the fixed member, but the scale may be fixed onto the fixed member and the sensor may be fixed onto the movable member. The first to fourth embodiments describe use of the reflective scale as the scale, but may use a transmission scale. The divider is not limited to that exemplified in the first to fourth embodiments, and any configuration may be used as long as it can generate a division signal for dividing the absolute position detection range into a plurality of determination areas.

While the first to fourth embodiments describe the number (wave number) as a code added to each detection unit (wave) of the second signal, but the code may not be the number and may be different for each detection unit.

While the first to fourth embodiments have described the lens barrel used for an optical apparatus such as an interchangeable lens and a camera, other embodiments of the present invention are applicable to a variety of apparatuses other than the optical apparatus.

Each embodiment can detect the absolute position of the movable member with high accuracy without limiting the movement amount of the movable member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-157893, filed on Aug. 27, 2018, which is hereby incorporated by reference herein in its entirety.

What is claimed is:

1. An absolute position detection apparatus comprising:
    a scale with a plurality of types of periodic patterns, each type having a different pitch;
    a sensor configured to output two sine wave detection signals with a 90° phase difference, each detection signal corresponding to one of the plurality of types of periodic patterns according to a relative movement between the scale and the sensor; and a calculator configured to generate, based on phase information which corresponds to the relative movement and is acquired by arctangent transformation of the two sine wave detection signals with a 90° phase difference, a first signal having a detection unit set to a first relative movement amount between the scale and the sensor, and a second signal having a detection unit set to a second relative movement amount, smaller than the first relative movement amount, between the scale and the sensor, to determine, as a code corresponding to each of a plurality of second signals, a relationship between the first signal and the plurality of second signals by comparing the first signal and the plurality of second signals, the first signal, which indicates the first relative movement amount, corresponding to a plurality of consecutive second signals, which indicates the second relative movement amount, and to obtain an absolute position in a relative movement direction of the scale and the sensor, based on the first and second signals, wherein a relative movement range of the scale and the sensor includes a boundary which is a repetition part of adjacent detection units in the first signal, wherein the absolute position detection apparatus further comprises a divider configured to divide the relative movement range into a plurality of areas, wherein the divider is provided such that at most one of respective boundaries of the first signal is included inside both ends of each of the plurality of areas, wherein in each of the plurality of areas, the code of each detection unit of the second signal is different from each other, and wherein the calculator is configured to specify a detection unit of the first signal to be used to calculate the absolute position based on the code of each detection unit of the second signal in an area, that includes the boundary of the first signal inside the both ends, of the plurality of areas.

2. The absolute position detection apparatus according to claim 1, wherein each of the plurality of areas is shorter than the detection unit of the first signal in a direction of the relative movement.

3. The absolute position detection apparatus according to claim 1, wherein the calculator is configured to specify the detection unit in the first signal based on comparing of the code with a predetermined code.

4. The absolute position detection apparatus according to claim 1, further comprising at least one detecting device configured to output a division signal to divide the relative movement range into the plurality of areas.

5. An apparatus comprising:
an absolute position detection apparatus; and
a movable member whose absolute position is detected by the absolute position detection apparatus,
wherein the absolute position detection apparatus includes:
a scale with a plurality of types of periodic patterns, each type having a different pitch;
a sensor configured to output two sine wave detection signals with a 90° phase difference, each detection signal corresponding to one of the plurality of types of periodic patterns according to a relative movement between the scale and the sensor; and
a calculator configured to generate, based on phase information which corresponds to the relative movement and is acquired by arctangent transformation of the two sine wave detection signals with a 90° phase difference, a first signal having a detection unit set to a first relative movement amount between the scale and the sensor, and a second signal having a detection unit set to a second relative movement amount, smaller than the first relative movement amount, between the scale and the sensor, to determine, as a code corresponding to each of a plurality of second signals, a relationship between the first signal and the plurality of second signals by comparing the first signal and the plurality of second signals, the first signal, which indicates the first relative movement amount, corresponding to a plurality of consecutive second signals, which indicates the second relative movement amount, and to obtain an absolute position in a relative movement direction of the scale and the sensor, based on the first and second signals, wherein a relative movement range of the scale and the sensor includes a boundary which is a repetition part of adjacent detection units in the first signal, wherein the absolute position detection apparatus further comprises a divider configured to divide the relative movement range into a plurality of areas, wherein the divider is provided such that at most one of respective boundaries of the first signal is included inside both ends of each of the plurality of areas, wherein in each of the plurality of areas, the code of each detection unit of the second signal is different from each other, and wherein the calculator is configured to specify a detection unit of the first signal to be used to calculate the absolute position based on the code of each detection unit of the second signal in an area, that includes the boundary of the first signal inside the both ends, of the plurality of areas.

6. An absolute position detection method using a scale having a plurality of types of periodic patterns, each type having a different pitch, and a sensor configured to output two sine wave detection signals with a 90° phase difference, each detection signal corresponding to one of the plurality of types of periodic patterns according to a relative movement between the scale and the sensor, the absolute position detection method comprising steps of:

generating, based on phase information which corresponds to the relative movement and is acquired by arctangent transformation of the two sine wave detection signals with a 90° phase difference, a first signal having a detection unit set to a first relative movement amount between the scale and the sensor, and a second signal having a detection unit set to a second relative movement amount, smaller than the first relative movement amount, between the scale and the sensor;

determining, as a code corresponding to each of a plurality of second signals, a relationship between the first signal and the plurality of second signals by comparing the first signal and the plurality of second signals, the first signal, which indicates the first relative movement amount, corresponding to a plurality of consecutive second signals, which indicates the second relative movement amount; and obtaining an absolute position in a relative movement direction of the scale and the sensor, based on the first and second signals, wherein a relative movement range of the scale and the sensor includes a boundary which is a repetition part of adjacent detection units in the first signal, wherein the absolute position detection method further comprises dividing the relative movement range into a plurality of areas, such that at most one of respective boundaries of the first signal is included inside both ends of each of the plurality of areas, wherein in each of the plurality of areas, the code of each detection unit of the second signal is different from each other, and wherein the step of obtaining specifies a detection unit of the first signal to be used to calculate the absolute position based on the code of each detection unit of the second signal in an area, that includes the boundary of the first signal inside the both ends, of the plurality of areas.

7. A non-transitory computer-readable storage medium storing a computer program for causing a computer to execute an absolute position detection method defined in claim 6.

* * * * *